United States Patent
Cha et al.

(10) Patent No.: US 8,502,670 B2
(45) Date of Patent: Aug. 6, 2013

(54) REAL-TIME RFID POSITIONING SYSTEM AND METHOD, REPEATER INSTALLATION METHOD THEREFOR, POSITION CONFIRMATION SERVICE SYSTEM USING THE SAME

(75) Inventors: Maeng-Q Cha, Anyang-si (KR); Song-Hoon Baik, Daejon (KR); Myung-Woo Seo, Daejon (KR)

(73) Assignee: KT Corporation, Gyeonggi-do (KR)

( * ) Notice: Subject to any disclaimer, the term of this patent is extended or adjusted under 35 U.S.C. 154(b) by 1033 days.

(21) Appl. No.: 12/446,258

(22) PCT Filed: Oct. 20, 2007

(86) PCT No.: PCT/KR2007/005112
§ 371 (c)(1),
(2), (4) Date: May 8, 2009

(87) PCT Pub. No.: WO2008/048059
PCT Pub. Date: Apr. 24, 2008

(65) Prior Publication Data
US 2010/0295943 A1 Nov. 25, 2010

(30) Foreign Application Priority Data

Oct. 20, 2006 (KR) .................. 10-2006-0102128
Feb. 14, 2007 (KR) .................. 10-2007-0015498
Aug. 28, 2007 (KR) .................. 10-2007-0086752
Aug. 28, 2007 (KR) .................. 10-2007-0086760

(51) Int. Cl.
*H04L 1/24* (2006.01)
(52) U.S. Cl.
USPC ..................................... 340/572.1

(58) Field of Classification Search
USPC ............................. 340/572.1, 506
See application file for complete search history.

(56) References Cited

U.S. PATENT DOCUMENTS

| 5,793,704 | A | 8/1998 | Freger |
| 6,549,064 | B2 * | 4/2003 | Bandy et al. .................. 327/536 |
| 6,577,238 | B1 | 6/2003 | Whitesmith et al. |
| 6,750,769 | B1 * | 6/2004 | Smith ........................ 340/572.1 |
| 7,905,402 | B2 * | 3/2011 | Kwak et al. ................... 235/385 |
| 2006/0206246 | A1 * | 9/2006 | Walker ............................. 701/16 |
| 2006/0256959 | A1 * | 11/2006 | Hymes ..................... 379/433.04 |

FOREIGN PATENT DOCUMENTS

| JP | 18-503286 | 4/2004 |
| JP | 18-266859 | 10/2006 |
| KR | 10-0351962 B1 | 9/2002 |
| KR | 10-2003-0093387 A | 12/2003 |
| KR | 10-2005-0045058 | 5/2005 |
| KR | 10-2005-0099742 | 10/2005 |
| KR | 1020060066923 | 6/2006 |

* cited by examiner

*Primary Examiner* — Khanh Dinh
(74) *Attorney, Agent, or Firm* — IP Legal Services, LLC

(57) ABSTRACT

Provided are to a real-time RFID location determination system for accurately determining a location of a mobile object using radio frequency identification (RFID) in real-time, a method thereof, and a method for installing a wireless repeater such as a RFID reader or a RFID reader and an access point (AP) using the same. The location determination system includes: a wireless repeater for identifying a radio frequency identification (RFID) tag by communicating with the RFID tag attached or installed at a target object to determine a location thereof, wherein the wireless repeater is installed a urban facility and a location of the target object is determined based on a coordinate of a corresponding urban facility as a reference point.

57 Claims, 17 Drawing Sheets

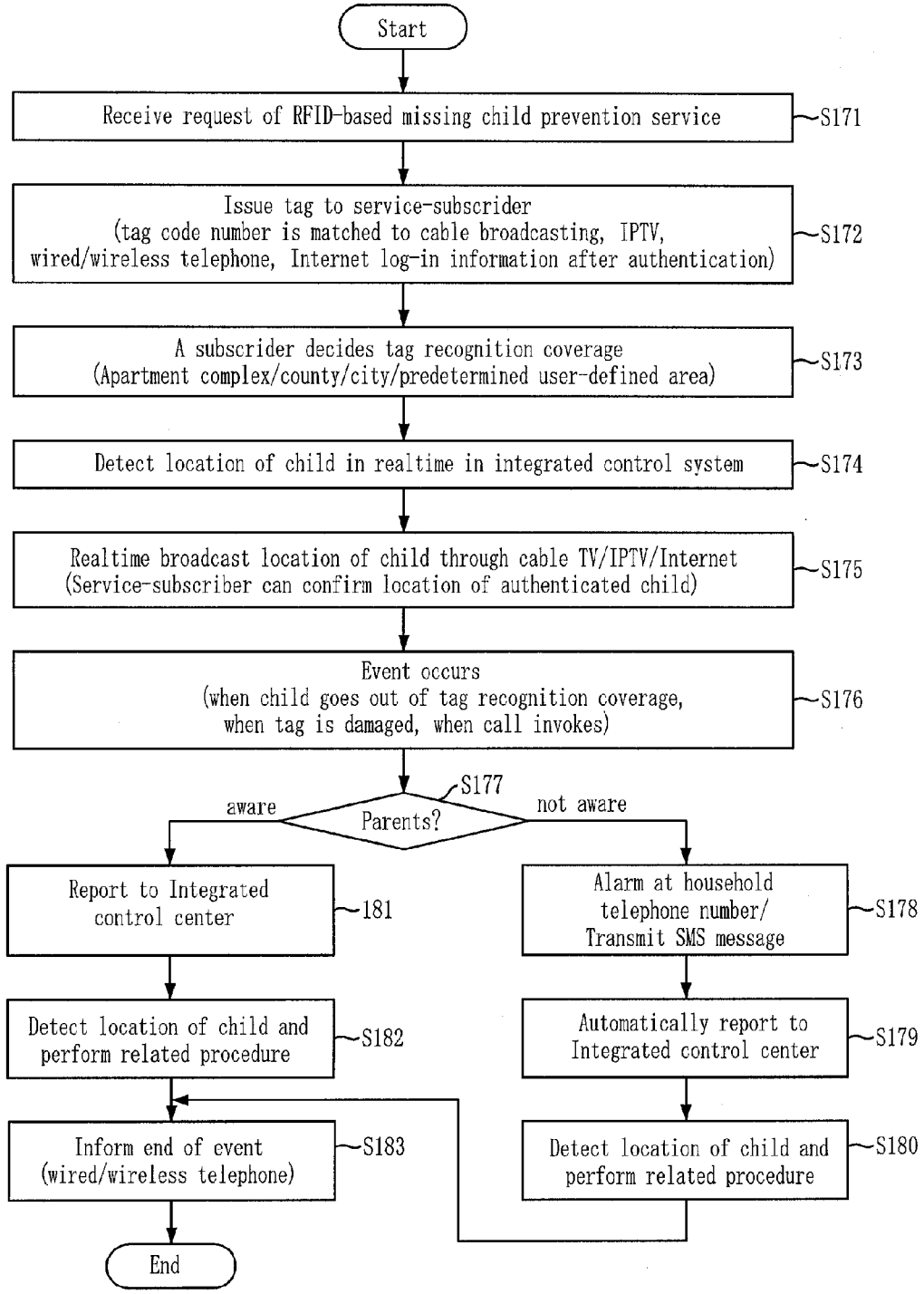

REAL-TIME RFID POSITIONING SYSTEM AND METHOD, REPEATER INSTALLATION METHOD THEREFOR, POSITION CONFIRMATION SERVICE SYSTEM USING THE SAME

TECHNICAL FIELD

The present invention relates to a location determination technology for determining a location of a mobile object; and, more particularly, to a real-time RFID location determination system for accurately determining a location of a mobile object using radio frequency identification (RFID) in real-time, a method thereof, and a method for installing a wireless repeater such as a RFID reader or a RFID reader and an access point (AP) using the same.

The present invention also relates to a service for determining a location of a mobile object; and more particularly, to a mobile object location determination service providing system and method for accurately determining a location of a target object to protect, such as a child, an old person, a mentally disabled person, a pet, a product, an art, a vehicle, a notebook computer, and a personal digital assistant (PDA), in real time using RFID and communication networks such as a broadcasting network including TV and IPTV, a telephone network, a mobile communication network, a wireless/wired Internet, a mobile Internet.

BACKGROUND ART

In Korea, more than 3000 missing children are reported in a year. According to the statistics data of a year 2005 from a national police agency, children were generally lost around their home as well as public places with crowded such as amusement parks, malls, and national parks. The missing child problem is no more a personal problem. It became a social problem that all parents must consider. Children cannot remember a home telephone number or a home address if they lost their parent although they memorize the home telephone number or the home address before. Senior citizens or mentally disabled persons may have the same problem if they lost their guardians. Such a missing children problem is not only a problem of Korea. It has been addressed as a worldwide problem. Therefore, there have been many researches in progress for overcoming the missing children problem.

Also, crimes related to kidnapping, violence, bandits, and homicides have increased day by day.

In order to prevent the missing children or the crimes, it is necessary to monitor a target object to protect through real-time location determination scheme. Here, the target object to protect may be a child, a mentally disabled person, a pet, a valuable product, and an art. In case of the missing child, children would have more mental damages and may become more frightened as time goes on. It is better to find the missing children as soon as possible. In order to prevent kidnapping and missing child, it is necessary to provide a missing child preventing service using a ubiquitous computing system. Therefore, the missing child preventing service has been developed using high-tech such as RFID, GPS network, CCTV, and mobile communication. The effectiveness of the missing child prevention service can be improved through an accurate location tracking technology.

Hereinafter, the shortcoming of location tracking technologies according to the related art will be described. The wireless communication technology is classified into a wide range wireless mobile communication technology for providing a wireless communication service in a wide area and a short range wireless mobile communication technology for providing a wireless communication service in a small area such as home, an office, a factory, a warehouse, and a special complex.

A conventional short range wireless communication technology enabled voice communication or simple and small data transmission through a two way radio. According to the development of a digital communication technology and a semiconductor technology, various short range wireless communication solutions have been developed and introduced for transmitting various wireless data, wireless-controlling devices, and transmitting multimedia data such as voice, audio, and video. Particularly, many wireless communication solutions for determining the locations of various objects in a short range communication network have been developed.

The location determination technology for determining locations of mobile objects has being receiving attraction and there have been many researches in progress because the location determination technology may be used not only for military purpose but also civil purposes such as preventions of mission child, distribution management, business support, supervision of rescuers in emergency situation, and providence of driving information.

In the location determination technology according to the related art, a global positioning system or the location information in base stations in a mobile communication network were generally use.

Since the GPS provides a stable service using fixed satellites having a wide signal range, the GPS has been widely used to determine locations of mobile objects in outdoor. However, the GPS has shortcomings as follows. That is, the GPS has a limitation of using the satellites and has high power consumption. Also, a time to first fix (TTFF) is very long, and the accuracy thereof may deteriorate in an urban area and a shadow area due to multipath and insufficiency of visual satellites.

As described above, it is impossible to use a GPS based location determination system in an indoor place and a densely packed urban area. Also, the GPS based location determination system may provide comparative good performance in wide area but may provide inaccurate result in a small area, such as an area of several tens square meters.

In order to overcome such shortcomings, Korea Patent Publication No. 0351962 entitled "Navigation system using pseudo satellite" disclosed a method for determining a location a mobile object in an indoor place by modifying a location determination system according to the related art. However, this method has a problem of large signal intensity variation in a short range.

Meanwhile, various location awareness technologies using ultrasonic wave were introduced. For example, the bat ultrasonic location system was introduced as an active bat system from AT&T Laboratories Cambridge. The ultrasonic location system radiates ultrasonic wave to a mobile object. Due to the interference characteristics of the ultrasonic wave, it is difficult to simultaneously transmit a plurality of ultrasonic waves. In the ultrasonic location determination system, a mobile object radiates the ultrasonic wave and a plurality of receivers measure an arrival time. However, the ultrasonic based location determination method is applicable to one mobile object.

Korea Patent Publication No. 2003-0093387 entitled "ultrasonic sensor system for estimating location and direction of mobile object" introduced a method of receiving ultrasonic wave in a mobile object. Since the mobile object receives the ultrasonic wave, it is impossible to independently operate each of mobile objects. Particularly, a predetermined rule is required to operate due to interference of ultrasonic wave when a plurality of mobile objects are present.

A method for measuring a distance using ultrasonic wave through maximum amplitude in U.S. Pat. No. 5,793,704 issued to Freger and entitled "METHOD AND DEVICE FOR ULTRASONIC RANGING". However, this method is very complicated and has limited performance.

Various approaches have been introduced for determining a location of a mobile object using wired/wireless mobile communication. However, the accuracy thereof abruptly varies according to a size of a base station cell and a measuring method due to the measurement error, for example, from about 500 meters to several kilometers according to the location of a base station. For accurate measurement, several methods were introduced using radio frequency identification (RFID).

The RFID technology was introduced to identify an object. However, the RFID technology has been advanced to a location awareness technology. Particularly, the RFID has advantages of determining a location and transmitting and receiving information through a sensor network. However, the RFID has been used for location determination in an indoor space. The RFID has not been used for location determination in an outdoor space.

As an example of using RFID for location determination, a system Cricket was introduced. In the Cricket, a Beacon is installed at a ceiling and radiates an ultrasonic wave and a RF signal. A Listener senses the ultrasonic wave or the RF signal transmitted from the Beacon. Then, a distance from the Listener to the Beacon is measured using the difference of arrival times of the ultrasonic wave and the RF signal. The Cricket accurately determines the location of a mobile object because the Cricket includes an algorithm for preventing the collision of Beacons and another algorithm for estimating a location using a kalman filter. However, the Cricket also has shortcomings. That is, a Beacon must be installed at every 16 sqft (about 1.32232 $m^2$) because of a short ultrasonic range. If visual is not obtained due to obstacles, it is difficult to determine the location of a mobile object.

A location identification based on dynamic active RFID calibration (LANDMARK) was introduced. The LANDMARK applies a location reference point to a RFID tag in order to calibrate a location value. The LANDMARK reduces the number of readers required for indoor measurement and sustains the reliable accuracy through dynamically updating information about a reference point. However, the LANDMARK cannot accurately determine locations when obstacles are present.

Since the RFID technology was designed for indoor places, it is not suitable for a mobile object that travels outdoor places at a high speed.

DISCLOSURE

Technical Problem

An embodiment of the present invention is directed to providing a technology for determining a location of a target mobile object with high accuracy regardless of external environmental factors and providing a related service based on the location determination result.

Another embodiment of the present invention is directed to providing a real-time location determination system and method for accurately determining a location of a mobile object in real-time using radio frequency identification (RFID).

Further another embodiment of the present invention is directed to providing a method of installing a wireless repeater such as a RFID reader or a RFID reader+an access point (AP) using single row triangles to accurately position a location of the object by reducing error.

Still another embodiment of the present invention is directed to providing a mobile object positioning service providing system and method for accurately determining a location of a target object to protect, such as a child, an old person, a mentally disabled person, a pet, a product, an art, a vehicle, a notebook computer, and a personal digital assistant (PDA), in real time using RFID and communication networks such as a broadcasting network including TV and IPTV, a telephone network, a mobile communication network, a wireless/wired Internet, a mobile Internet.

Other objects and advantages of the present invention can be understood by the following description, and become apparent with reference to the embodiments of the present invention. Also, it is obvious to those skilled in the art of the present invention that the objects and advantages of the present invention can be realized by the unit as claimed and combinations thereof.

Technical Solution

In accordance with an aspect of the present invention, there is provided a system for determining a location of a mobile object in real-time, including: a wireless repeater for identifying a radio frequency identification (RFID) tag by communicating with the RFID tag attached or installed at a target object to determine a location thereof, wherein the wireless repeater is installed an urban facility and a location of the target object is determined based on a coordinate of a corresponding urban facility as a reference point.

In accordance with another aspect of the present invention, there is provided a system for determining a location of a mobile object in real-time, including: a wireless repeater for identifying a radio frequency identification (RFID) tag by communicating with the RFID tag attached/installed at a target object to determine a location thereof; and a location determination server for determining a location of the target object based on a coordinate of a corresponding urban facility installed at the wireless repeater as a reference point.

In accordance with further another aspect of the present invention, there is provided method for determining a location of a mobile object in real time, including the steps of: at a wireless repeater installed in an urban facility, transmitting a search signal at a regular interval; at the wireless repeater, receiving a response signal for the search signal from a RFID tag installed/attached at a target object to determine a location thereof and identifying the RFID tag; and at the wireless repeater, determining a location of the target object based on coordinates of corresponding urban facilities as reference points.

In accordance with still another aspect of the present invention, there is provided a method for determining a location of a mobile object including the steps of: at a wireless repeater installed in an urban facility, transmitting a search signal at a regular interval; at the wireless repeater, receiving a response signal for the search signal from a RFID tag installed/attached at a target object to determine a location thereof and identifying the RFID tag; and at a location determination server, determining a location of the target object based on coordinates of corresponding urban facilities as reference points.

In accordance with yet another aspect of the present invention, there is provided a computer-readable recording medium for storing a program for executing a method in a location determination service system with a processor, the for determining a location of a mobile object in real time, including the steps of: at a wireless repeater installed in an urban facility, transmitting a search signal at a regular interval; at the wireless repeater, receiving a response signal for the search signal from a RFID tag installed/attached at a target object to determine a location thereof and identifying the RFID tag; and at the wireless repeater, determining a location of the target object based on coordinates of corresponding urban facilities as reference points.

In accordance with yet another aspect of the present invention, there is provided a computer-readable recording medium for storing a program for executing a method in a location determination service system with a processor, the method for determining a location of a mobile object including the functions of: at a wireless repeater installed in a urban facility, transmitting a search signal at a regular interval; at the wireless repeater, receiving a response signal for the search signal from a RFID tag installed/attached at a target object to determine a location thereof and identifying the RFID tag; and at a location determination server, determining a location of the target object based on coordinates of corresponding urban facilities as reference points.

In accordance with yet another aspect of the present invention, there is provided a method for installing a wireless repeater including: installing a radio frequency identification (RFID) reader in a urban facility where the RFID reader identifies a RFID tag by communicating with the RFID tag attached/installed at a target object to determine a location thereof, wherein at least three RFID readers are disposed to locate the RFID tag inside a single raw triangle structure.

In accordance with yet another aspect of the present invention, there is provided a system for providing a location determination service, including: a database for mapping radio frequency identification (RFID) tags provided to each subscriber to a corresponding subscriber and managing the mapped RFID tags; and a location information providing unit for classifying location information of each RFID tags, which are determined based on coordinates of urban facilities having wireless repeaters that identify the RFID tag attached/installed at a target object as reference location points, by a subscriber and providing the classified location information through a predetermined communication network set by a corresponding subscriber.

In accordance with yet another aspect of the present invention, there is provided a system for providing a location determination service including: a database for mapping radio frequency identification (RFID) tags provided to each subscriber to a corresponding subscriber and managing the mapped RFID tags; and a location information providing unit for classifying location information determined by identifying each RFID tag by a subscriber and providing the classified location information through a broadcasting network.

In accordance with yet another aspect of the present invention, there is provided a system for providing a location determination service including: a database for mapping radio frequency identification (RFID) tags provided to each subscriber to a corresponding subscriber and managing the mapped RFID tags; and a location information providing unit for classifying location information of each RFID tag, which is determined based on coordinates of urban facilities having wireless delay devices that identify the RFID tag attached/installed at a target object, by a subscriber and providing the classified location information through a broadcasting network.

In accordance with yet another aspect of the present invention, there is provided a system for providing a location determination service, including: a wireless repeater for identifying a RFID tag attached/installed at a target object by communicating with the RFID tag; a database for mapping the RFID tags provided to each subscriber to a corresponding subscriber and managing the mapped RFID tags; and a location information providing unit for classifying location information of each RFID tag, which is determined based on coordinates of corresponding urban facilities having the wireless repeater by a subscriber and providing the classified location information through a broadcasting network.

In accordance with yet another aspect of the present invention, there is provided a system for providing a location determination service, including: a wireless repeater for identifying a RFID tag attached/installed at a target object by communicating with the RFID tag; a location determination server for determining a location of each RFID tag based on coordinates of corresponding urban facilities having the wireless repeater as reference location points; and a location information providing unit for classifying the determined location information of each RFID tag by a subscriber and providing the classified location information through a broadcasting network.

In accordance with yet another aspect of the present invention, there is provided a method for providing a location determination service, including the steps of: mapping radio frequency identification (RFID) tags provided to each subscriber to a corresponding subscriber and managing the mapped RFID tags in a database; and classifying location information of each RFID tags, which are determined based on coordinates of urban facilities having wireless repeaters that identify the RFID tag attached/installed at a target object as reference location points, by a subscriber and providing the classified location information through a predetermined communication network set by a corresponding subscriber.

In accordance with yet another aspect of the present invention, there is provided a method for providing a location determination service, including the steps of: mapping radio frequency identification (RFID) tags provided to each subscriber to a corresponding subscriber and managing the mapped RFID tags in a database; and classifying location information determined by identifying each RFID tag by a subscriber and providing the classified location information through a broadcasting network.

In accordance with yet another aspect of the present invention, there is provided a method for providing a location determination service including the steps of: mapping radio frequency identification (RFID) tags provided to each subscriber to a corresponding subscriber and managing the mapped RFID tags in a database; and classifying location information of each RFID tag, which is determined based on coordinates of urban facilities having wireless delay devices that identify the RFID tag attached/installed at a target object, by a subscriber and providing the classified location information through a broadcasting network.

In accordance with yet another aspect of the present invention, there is provided a method for providing a location determination service, including the steps of: mapping radio frequency identification (RFID) tags provided to each subscriber to a corresponding subscriber and managing the mapped RFID tags in a database; at a wireless repeater installed at an urban facility, transmitting a search signal at a regular interval and identifying a RFID tag by receiving a response signal for the search signal from the RFID tag attached/installed at a target object; at the wireless repeater, determining a location of the RFID tag based on coordinates of corresponding urban facilities as reference location points; and at an integrated control system classifying the determined location information of each RFID tag by a subscriber and providing the classified location information through a broadcasting network.

In accordance with yet another aspect of the present invention, there is provided a method for providing a location determination service including the steps of: mapping radio frequency identification (RFID) tags provided to each subscriber to a corresponding subscriber and managing the mapped RFID tags in a database; at a wireless repeater installed at an urban facility, transmitting a search signal at a regular interval and identifying a RFID tag by receiving a response signal for the search signal from the RFID tag attached/installed at a target object; at a location determination server, determining a location of the RFID tag based on coordinates of corresponding urban facilities as reference location points; and at an integrated control system classifying the determined location information of each RFID tag by a subscriber and providing the classified location information through a broadcasting network.

In accordance with yet another aspect of the present invention, there is provided a computer-readable recording medium for storing a program for executing a method in a location determination service system with a processor, the method including the steps of: mapping radio frequency identification (RFID) tags provided to each subscriber to a corresponding subscriber and managing the mapped RFID tags in a database; and classifying location information of each RFID tags, which are determined based on coordinates of urban facilities having wireless repeaters that identify the RFID tag attached/installed at a target object as reference location points, by a subscriber and providing the classified location information through a predetermined communication network set by a corresponding subscriber.

In accordance with yet another aspect of the present invention, there is provided a computer-readable recording medium for storing a program for executing a method in a location determination service system with a processor, the method including the steps of: mapping radio frequency identification (RFID) tags provided to each subscriber to a corresponding subscriber and managing the mapped RFID tags in a database; and classifying location information determined by identifying each RFID tag by a subscriber and providing the classified location information through a broadcasting network.

In accordance with yet another aspect of the present invention, there is provided a computer-readable recording medium for storing a program for executing a method in a location determination service system with a processor, the method including the steps of: mapping radio frequency identification (RFID) tags provided to each subscriber to a corresponding subscriber and managing the mapped RFID tags in a database; and classifying location information of each RFID tag, which is determined based on coordinates of urban facilities having wireless delay devices that identify the RFID tag attached/installed at a target object, by a subscriber and providing the classified location information through a broadcasting network.

In accordance with yet another aspect of the present invention, there is provided a computer-readable recording medium for storing a program for executing a method in a location determination service system with a processor, the method including the steps of: mapping radio frequency identification (RFID) tags provided to each subscriber to a corresponding subscriber and managing the mapped RFID tags in a database; at a wireless repeater installed at an urban facility, transmitting a search signal at a regular interval and identifying a RFID tag by receiving a response signal for the search signal from the RFID tag attached/installed at a target object; at the wireless repeater, determining a location of the RFID tag based on coordinates of corresponding urban facilities as reference location points; and at an integrated control system classifying the determined location information of each RFID tag by a subscriber and providing the classified location information through a broadcasting network.

In accordance with yet another aspect of the present invention, there is provided a computer-readable recording medium for storing a program for executing a method in a location determination service system with a processor, the method including the steps of: mapping radio frequency identification (RFID) tags provided to each subscriber to a corresponding subscriber and managing the mapped RFID tags in a database; at a wireless repeater installed at an urban facility, transmitting a search signal at a regular interval and identifying a RFID tag by receiving a response signal for the search signal from the RFID tag attached/installed at a target object; at a location determination server, determining a location of the RFID tag based on coordinates of corresponding urban facilities as reference location points; and at an integrated control system classifying the determined location information of each RFID tag by a subscriber and providing the classified location information through a broadcasting network.

Advantageous Effects

According to the present invention, a location of a mobile object can be accurately determined in real time regardless of environmental factors such as weather conditions.

Also, a distance error can be greatly reduced when RFID tags are disposed inside a single raw triangle structure compared to that when RFID tags are disposed outside the single raw triangle structure.

Furthermore, a location of a mobile object can be accurately determined in real time and a traveling path can be traced. Therefore, the present invention can be used to solve the problem of mission child.

BRIEF DESCRIPTION OF THE DRAWINGS

FIG. 17 is a flowchart of a method for providing a location tracking service in accordance with an embodiment of the present invention.

BEST MODE FOR THE INVENTION

Figure 1:
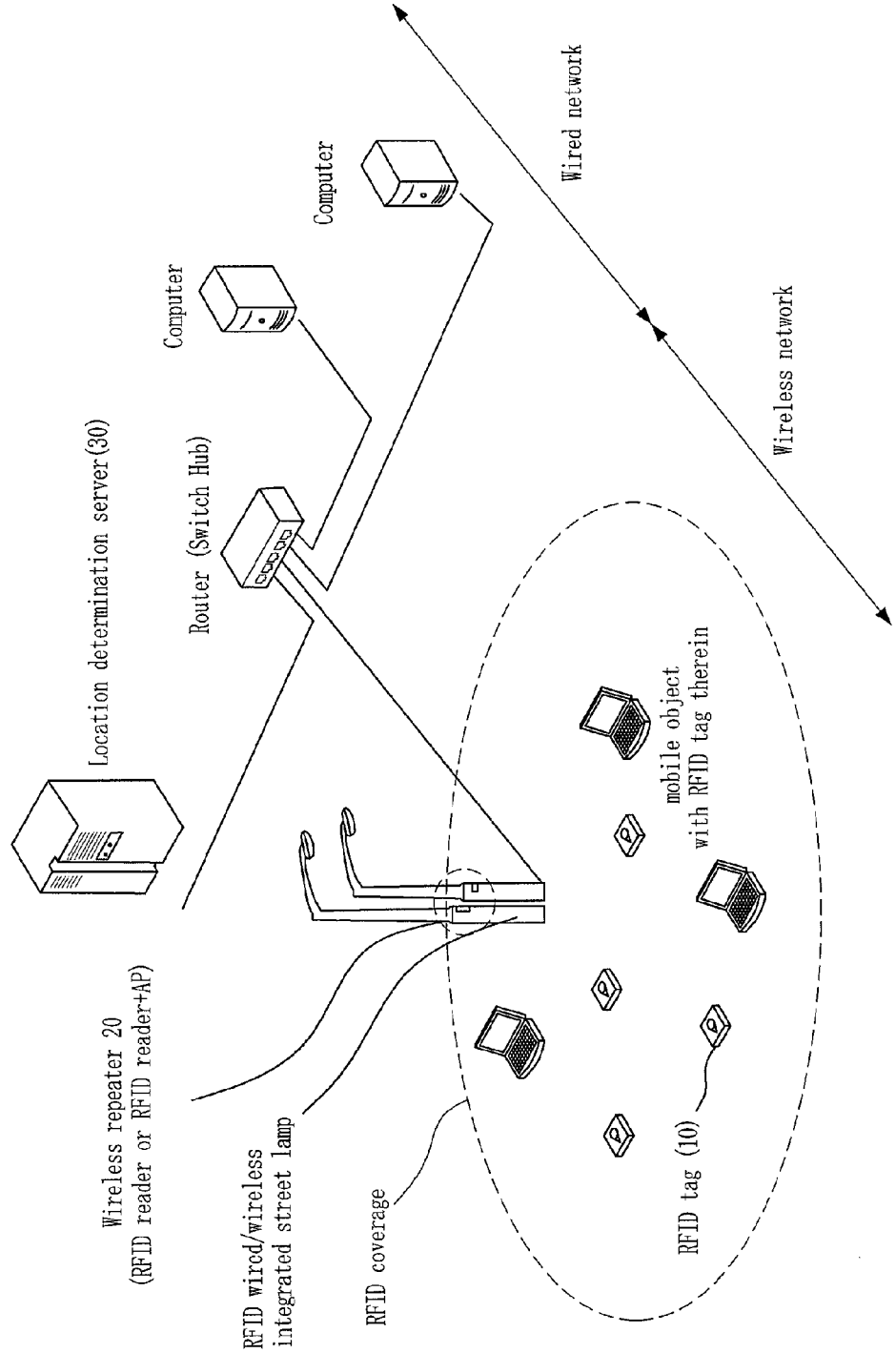
FIG. 1 is a diagram illustrating a location determination system in accordance with an embodiment of the present invention.

The advantages, features and aspects of the invention will become apparent from the following description of the embodiments with reference to the accompanying drawings, which is set forth hereinafter.

Hereinafter, a real-time location determination technology for accurately determining a location of a mobile object in real-time using radio frequency identification (RFID) regardless of external-environmental factors will be described at first with reference to FIGS. 1 to 13. Then, a method for providing a mobile object positioning service will be described with reference to FIGS. 14 to 17.

Generally, a RFID system was used to determine a location of a target object in an indoor place or a limited space such as a warehouse. Since an indoor space does not have a reference coordinate system such as global positioning system (GPS), different coordinate systems were used for indoor location determination systems such as a RFID system, a UWB system, an infrared system, and ultrasonic wave system. In order to apply the RFID technology to the outdoor place, it is required to define a coordinate system as an accurate location reference point. Also, it requires stationary facilities for applying power to a RFID reader.

In the present invention, a location of a mobile object is traced in realtime by installing a RFID reader at a stationary facility such as a streetlamp and using the coordinate of the stationary facility as a reference point. That is, streetlamps are selected as a stationary facility for installing a RFID reader because the streetlamp is installed at a regular interval, has a capability of supplying power, and has an accurate coordinate which is commonly used in worldwide using a digital map.

Here, a location reference point as a reference are provided for tracking a location of a mobile object based on a cell ID method, a received signal strength indication (RSSI) method, an angel of arrival (AOA) method, a direction of arrival (DoA) method, and a time difference of arrival (TDoA (time difference of arrival) method. [One location reference point is provided by the Cell ID method. Three location reference points are provided by the AoA, ToA, and TDoA (time difference of arrival) method, which use triangulation. More than one location reference points are provided in the RSSI method where triangulation may or may be not used. More than two location reference points are provided in the DoA method.]

Particularly, since a distance is calculated using times of transmitting and receiving a signal between a RFID reader and a RFID tag in the TDoA method, the location reference point is very important. Also, the shortcoming of the Cell ID method such as too wide coverage of a base station can be compensated because cells can be minutely formed if stationary facilities such as post lamps are used.

In the present embodiment, a TDoA based location tracking method will be described in detail. However, the present invention is not limited thereto. Hereinafter, each of location tracking methods will be described.

At first, a location of a mobile object can be tracked using ToA of a signal that is transmitted from a RFID tag and arrives at a plurality of RFID readers around the RFID tag. That is, a distance from a RFID reader to a RFID tag can be calculated based on the ToA of a signal at each of the RFID reader, and the location of the mobile object such as the RFID tag can be traced using the distance information obtained from a plurality of RFID readers around the RFID tag.

Secondly, in the RSSI based mobile object tracking technology, a location of a mobile object can be tracked by measuring the intensity of a RFID tag signal at two RFID readers. That is, if the attenuation of a receiving signal is calculated with the assumption that the transmission power of the RFID is known, a distance from a RFID tag to a RFID reader by applying a radio wave propagation model as shown in Eq. 1. The location of the mobile object such as a RFID tag can be tracked using the distance information.

$$L = 20\log_{10}\left(\frac{4\pi d}{\lambda}\right)[dB],\ d = \frac{\lambda}{4\pi} \cdot 10^{\frac{L}{20}} = \frac{c}{4\pi f} \cdot 10^{\frac{L}{20}} \qquad \text{Eq. 1}$$

Thirdly, in a DoA based location determination technology, a location of a mobile object such as a RFID tag is detected based on the crossing of directions after estimating the directions of arrival of two signals from two or more RFID readers. The DoA based location determination technology needs an array antenna at a cell such as a RFID reader.

Fourthly, in the TDoA based location determination technology, it is assumed that more than three cells such as RFID readers are participated in and each of the cells is synchronized. In each of the cells such as the RFID readers, an arrival time of a signal is measured and the difference of the measured arrival times of the RFID readers. The crossing of the cells is determined based on the time difference, and the location of the mobile object is determined based on the crossing.

Figure 12:
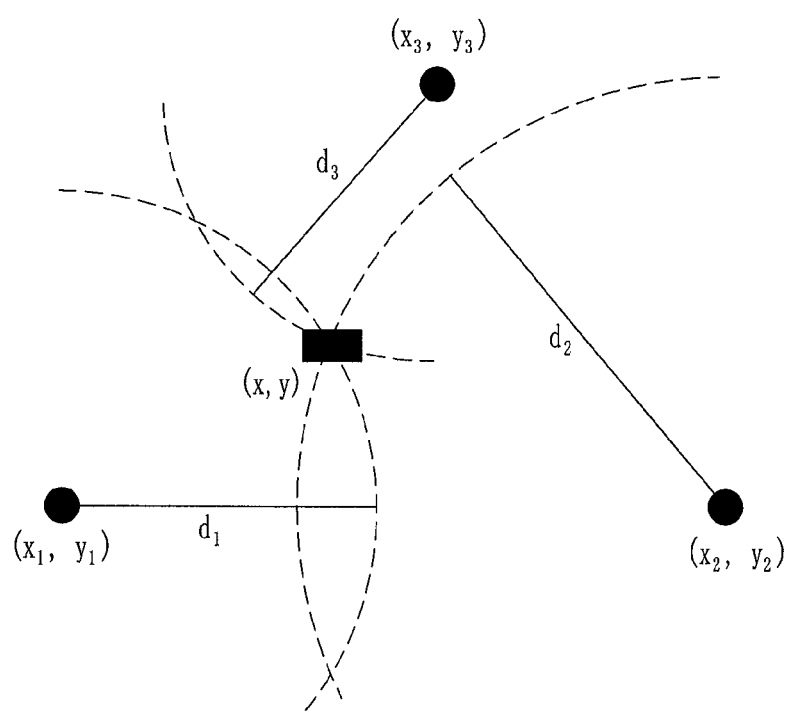
FIG. 12 is a diagram illustrating a method of tracking a location of a mobile object using triangulation in accordance with an embodiment of the present invention.

The triangulation based location determination method will be described with reference to FIG. 12. In the triangulation based location determination method, distances d1, d2, and d3 from RFID readers 1, 2, and 3 to a RFID tag are calculated. Then, the location of the RFID tag is determined based on the calculated distances. The triangulation calculates a distance between a RFID reader and a RFID tag based on Pythagorean proposition as shown in Eq. 2.

$$d_1^2 = (x-x_1)^2 + (y-y_1)^2$$

$$d_1^2 = (x-x_2)^2 + (y-y_2)^2$$

$$d_3^2 = (x-x_3)^2 + (y-y_3)^2 \qquad \text{Eq. 2}$$

Hereinafter, how to install RFID readers in streetlamps disposed at a regular interval on a street will be described.

That is, a signal raw triangles measuring method is used to how to install the RFID streetlamps using location reference points in the present invention.

The single raw triangle is a method for setting a measurement reference point in conventional land surveying. It is designed for an area having a narrow width and a long length, such as a stream, a street, and a tunnel. Therefore, RFID tags are installed in a single raw triangle that is formed of a plurality of RFID readers using the single raw triangles scheme.

Figure 13:
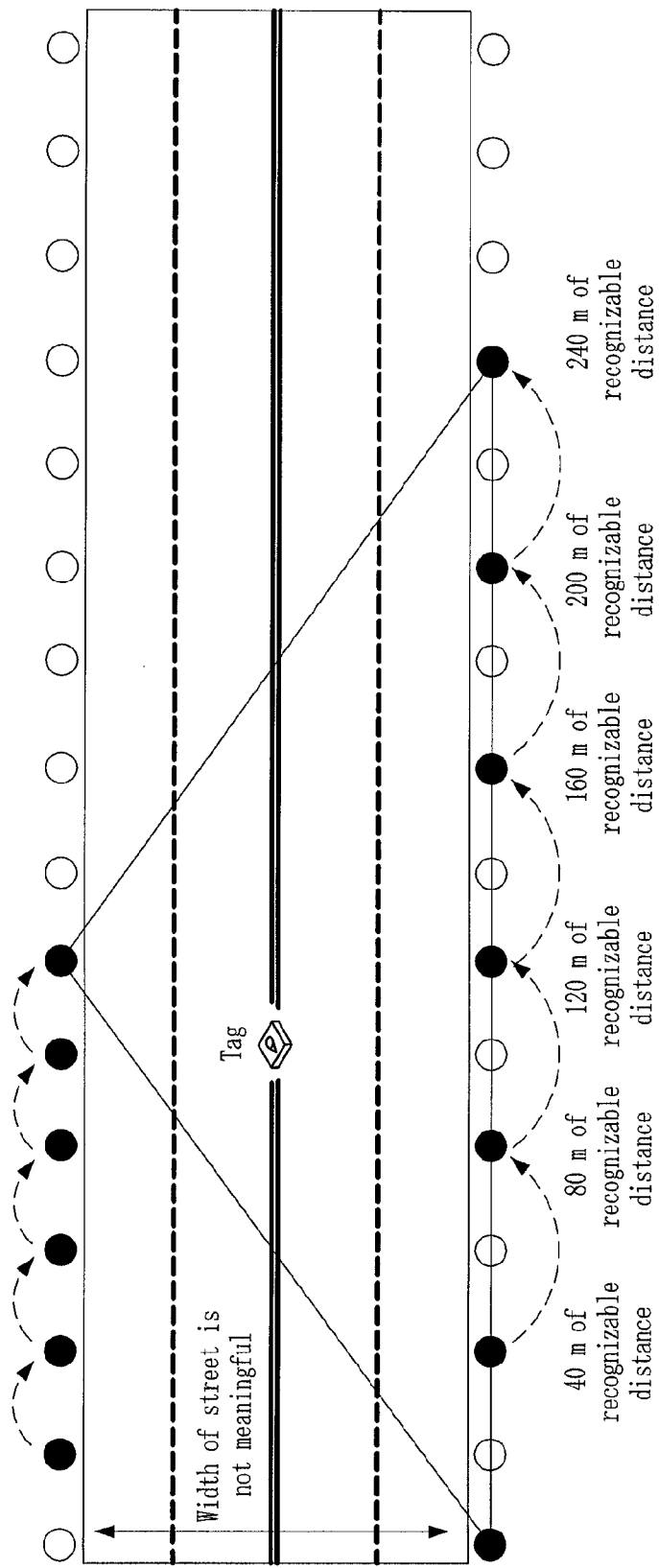
FIG. 13 is a diagram illustrating a method for installing a RFID reader using a single raw triangle network according to an embodiment of the present invention.

In FIG. 13, RFID readers are not installed at all of the streetlamps. That is, the RFID readers are installed at streetlamps disposed on one side of a street, and two RFID reader are disposed at two streetlamps disposed at the other side of the street, which form a single raw triangulation structure. That is, the number of RFID readers installed at the streetlamps is reduced. In the single raw triangle network, the accuracy of a location of the RFID tag is very high. The accuracy inside and outside the single raw triangle were confirmed by comparison simulations shown in FIGS. 5 to 11

Particularly, a width of a street is from the minimum of 3 m to the maximum of 50 m although the lengths of streets are different. Therefore, the RFID readers are installed at streetlamps that are disposed at a predetermined side of a street at a regular interval based on the length of the street in consideration of a RFID recognition distance and a communication range of a wireless access point.

If the single raw triangle network structure is used, it is possible to accurately track a location of a mobile object on a street. Also, the single raw triangle network may be used for a missing child prevention service. For example, parents can be informed when a child escapes from the triangle network structure such as an apartment complex.

FIG. 1 is a diagram illustrating a location determination system in accordance with an embodiment of the present invention.

As shown in FIG. 1, a location determination system according to the first embodiment of the present invention includes a wireless repeater 20 for identifying the RFID tag 10 by communicating with a RFID tag 10 disposed at a target object to determine the location thereof, for example, a child, an old person, a mentally disabled person, a pet, a product, an art, a vehicle, and a PDA, where the wireless repeater 20 includes a RFID reader or an access point connected to the RFID reader. The wireless repeater 20 is disposed at urban facilities such as a stationary facility having accurate location data and capable of supplying power. For example, the wireless repeater 20 is disposed at a streetlamp. Then, the wireless repeater 20 determines a location of a target object based on a coordinate of a corresponding urban facility such as a streetlamp, where the target object is a child, an old person, a mentally disabled person, a pet, a product, an art, a vehicle, and a PDA.

In the first embodiment, the wireless repeater 20 traces a location of a mobile object. In this case, the wireless repeater 20 stores a coordinate of own urban facility and coordinates of urban facilities having adjacent wireless repeaters in a form of a database.

A location determination system according to the second embodiment includes a wireless repeater 20 and a location determination server 30. The wireless repeater identifies the RFID tag 10 by communicating with a RFID tag 10 disposed at a target object to determine the location thereof, for example, a child, an old person, a mentally disabled person, a pet, a product, an art, a vehicle, and a PDA, where the wireless repeater 20 includes a RFID reader or an access point connected to the RFID reader. The wireless repeater 20 is disposed at urban facilities such as a stationary facility having accurate location data and capable of supplying power. The location determination server 30 determines a location of a target object using coordinates of corresponding urban facilities as reference points where the target object includes a child, an old person, a mentally disabled person, a pet, a product, an art, a vehicle, and a PDA.

In the second embodiment, the location determination server 30 determines the location of a mobile object. In this case, the location determination server 30 has a database of location information about adjacent urban facilities. Or, the location determined server 30 is provided with coordinates of corresponding urban facilities as reference from each of the wireless repeater 20 in real time when a location of a target object is determined.

In the first and second embodiments, at least three wireless repeaters 20 are disposed for an AoA based location determination method, a ToA based location determination method, a TDoA based location determination method, and a RSSI based triangulation method. That is, at least three wireless repeaters 20 are disposed at urban facilities such as streetlamps to form a triangle network. For example, a wireless repeater (RFID reader) 20 is disposed at a urban facility such as a streetlamp disposed at one side of a street and two wireless repeaters (RFID reader) 20 are disposed at other urban facilities disposed at the other side of the street to form the triangle network structure. That is, the RFID readers 20 are not installed at all of the streetlamps disposed at the street. One RFID reader 20 is disposed at a streetlamp disposed at one side of a street, and two RFID readers 20 are disposed at streetlamps disposed at the other side of the street. Therefore, the number of RFID readers 20 can be reduced.

In the first and second embodiments, a digital map for a geographic information system (GIS) may be used when reference locations are obtained.

In the Cell ID based location determination method, a location of a RFID tag 10 can be calculated based on the reference location database that stores coordinates of wireless delay devices 20 based on the cell IDs of the wireless repeaters 20 in the first and second embodiments.

In the ToA based location determination method, a distance between a wireless repeater 20 and a RFID tag 10 is calculated using a time of arrival (ToA) time of a signal transmitted from the RFID tag 10 and arrived at the wireless repeater 20. Then, a location of a RFID tag 10 can be calculated based on the calculated distance and the coordinates of the reference location database.

In the RSSI based location determination method, the attenuation of a signal received from a RFID tag 10 is measured, and a distance between a wireless repeater 20 and a RFID tag 10 is calculated by applying a suitable radio wave propagation model in an environment. Then, the location of a RFID tag 10 is calculated based on the calculated distance and the coordinates information in the reference location database.

In the DoA based location determination method, the DoAs of a signal are estimated, and a location of a RFID tag 10 is calculated based on the crossing of the estimated directions.

In the TDoA based location determination method, the TDoA of signals is obtained, and the location of the RFID tag 10 is calculated based on the crossing of cells obtained based on the TDoA.

In the location determination system according to the first embodiment, if triangulation such as the TDoA based location determination method is used, at least three wireless repeaters 20 are disposed. At least one of the three wireless repeater 20 includes a reference location database which stores the coordinates of urban facilities such as streetlamps where adjacent RFID readers that are participated to determine a location of a mobile object.

Therefore, each of at least three wireless repeaters 20 regularly transmits a search signal. If a RFID tag 10 in the propagation area of the search signal generates a response signal with own ID in response to the search signal thereof, a distance between the wireless repeater 20 and the RFID tag 10 based on a difference of the time of transmitting the search signal and a time of receiving the response signal received at the RFID tag 10. Then, the location of the RFID tag 10 is calculated based on the calculated distance and the coordinates in the reference location database.

In the location determination system according to the second embodiment, if triangulation such as the TDoA based location determination method is used, the location determination server 30 includes a reference location database which stores coordinates of urban facilities as reference locations. Therefore, at least three of wireless repeaters 20 transmit a search signal regularly. If a RFID tag in the propagation area of the search signal generates a response signal with an own ID in responses to the search signal, a distance between the own wireless repeater 20 and the RFID tag 10 is calculated based on a difference between a time of transmitting the search signal and a time of receiving a response signal received from the RFID tag 10, and transmits the calculated distance to the location determination server 30. The location determination server 30 can calculate a location of a RFID tag 10 based on the distance and the reference location database.

In the location determination system according to the first embodiment, the determined location of a target object is transmitted to the RFID tag 10 and/or the location determination server 20 through a wireless link. Also, the determined location of the target object may be transmitted to another application service server (computer) such as a missing child prevention service server through a wired communication network or a wireless communication network.

In the location determination system according to the second embodiment, the determined location of a target object is transmitted to the RFID tag 10 through a wireless link, or transmitted to the location determination server 20 and/or another application service server such as a missing child prevention service server through a wired/wireless communication network.

As shown in FIG. 1, the location determination system according to the present embodiment includes wireless repeaters 20, such as a RFID reader or an access point, installed at a plurality of streetlamps that are disposed at a street side, a location determination server 30, and another application service server for providing services related to location determination such as a missing child prevention service. The wireless repeaters 20, the location determination server 30, and another application service server are connected through a wired/wireless network.

It is preferable that a RFID reader 20 that has comparative wide range to recognize a RFID tag 10, for example, about 200 m to 400 m.

It is preferable that a gap between the RFID readers 10 is about 100 m and a height of installing the RFID reader 20 is about 3.5 m from the ground. However, a RFID reader 20 may have a recognition range of several tens meter in the side of a main street where streetlamps are densely disposed. The RFID reader 20 transmits a search signal at a regular interval, for example, several nano seconds (ns).

The RFID tag 10 may be carried by a mobile object such as a person and a domestic animal or may be attached at a mobile object such as a vehicle, a notebook, and a PDA. The RFID tag 10 travels at a predetermined speed by the mobile object. IF the RFID tag 10 is in the recognition range of the RFID reader 20 (a radio wave propagation range of a search signal), the RFID tag 10 recognizes the search signal of the RFID reader 20 and transmits a response signal including own ID information in response to the search signal.

Then, the RFID reader 20 can calculate a distance to the RFID tag 10 using a difference between a time of transmitting the search signal and a time of receiving the response signal from the RFID tag 10. For example, each of three RFID readers 20 calculates a distance to a RFID tag 10 that responses to a search signal based on a difference between a time of transmitting the search signal and a time of receiving the response signal from the RFID tag 10, such as a difference value generated by comparing the time of transmitting the search signal and the time of receiving the response signal from the RFID tag 10.

That is, since the propagation speed of each signal is the velocity of light, the distance to the RFID tag 10 can be calculated by multiplying the velocity of light to the time difference between the time of transmitting the search signal and the time of receiving the response signal. Here, if a response time, which is taken by the RFID tag 10 to response the search signal, is not small enough to ignore, the response time is subtracted from the time difference before multiplying the velocity of light.

Since the recognition areas of a plurality of the RFID readers 20 overlap, a plurality of RFID readers 20 calculate a distance to the same RFID tag 10. After calculating the distance to a predetermined RFID tag 10, the RFID readers 20 calculate the location of the RFID tag 10 based on a location determination algorithm that will be described in later. Then the calculated location is transmitted to the RFID tag 10 or the location determination server 30 and/or another application service server such as a missing child prevention service server. The location determination server 30 and the application service server store and manage the received locations of the RFID tags. Here, the transmission of the calculated location of the RFID tag 10 from the RFID reader 20 to the location determination server 30 and/or the other application service server may pass through a wired network or may be wirelessly transmitted through a wireless access point (AP) which is installed at a street lamp and connected to the RFID reader 20.

The location determination server 30 stores the locations of streetlamps disposed in an own coverage area, that is, the locations of the RFID readers 20, and transfers the locations of adjacent RFID readers, which are participated in determination of a location of a mobile object, according to the request of a predetermined RFID reader.

Figure 2:
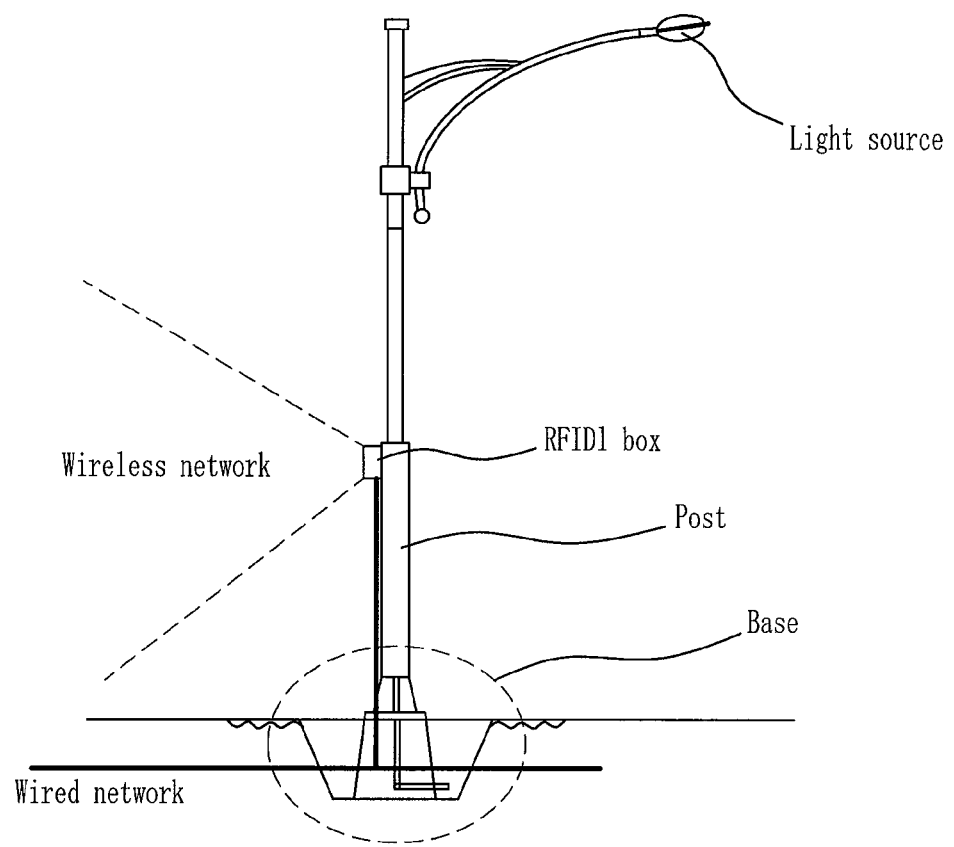
FIG. 2 is a diagram illustrating a streetlamp having a wireless repeater for determining a location of a mobile object in accordance with an embodiment of the present invention.

FIG. 2 is a diagram illustrating a streetlamp having a wireless repeater for determining a location of a mobile object in accordance with an embodiment of the present invention.

Referring to FIG. 2, the streetlamp having the wireless repeater 20 includes a post and a base.

A RFID reader or a wireless AP connected to a RFID reader is installed at the post. It is preferable that the RFID reader 20 is installed at a height of about 3.5 m from the ground. In order to minimize the influence of a strong wind and a heavy rain, a groove may be formed on the post and an internal box with a plastic cover may be inserted in the groove for housing the RFID reader or the wireless AP connected to the RFID reader.

A wireless communication network is installed at the base of the streetlamp for transmitting the location tracking data of a RFID reader 20. Here, it is preferable to form a network by connecting an optical cable as a normal band in case of installing the AP.

Figure 3:
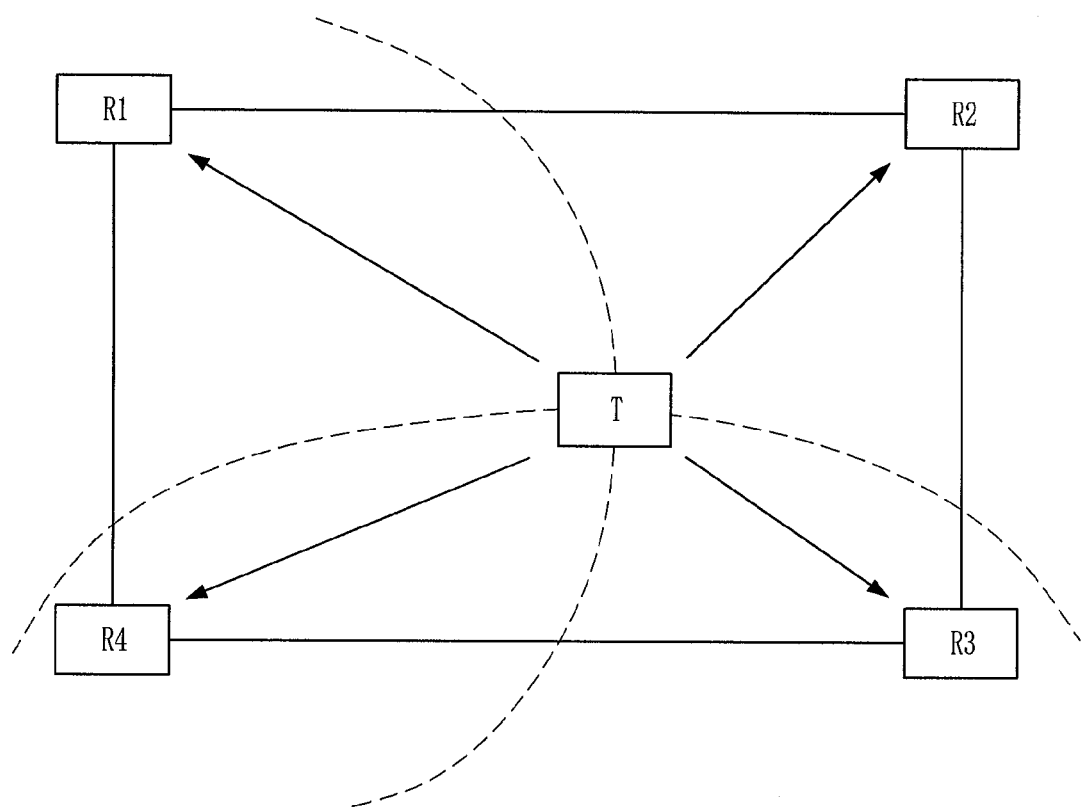
FIG. 3 is a diagram for described a method for determining a location of a mobile object in accordance with an embodiment of the present invention.

FIG. 3 is a diagram for described a method for determining a location of a mobile object in accordance with an embodiment of the present invention. As shown in FIG. 3, a mobile object T such as a RFID tag can be located on a hyperbolic curve having two reference location points among a plurality of reference location points R1 to R4. In the present embodiment, the reference location point is a RFID reader installed at a streetlamp.

Since the location determination server 30 or each of the RFID readers 20 store the reference location points, the hyperbolic curves can be formed based on the location of a reference location point, a reference location point, and a distance from the reference location point to a mobile object.

In FIG. 3, four reference location points are shown. However, a location of a mobile object on a plane can be calculated using at least three of location reference points. In the present embodiment, the latitude, the longitude, and the altitude of a mobile object are calculated. Therefore, the location determination is described to use four reference location points.

Figure 4:
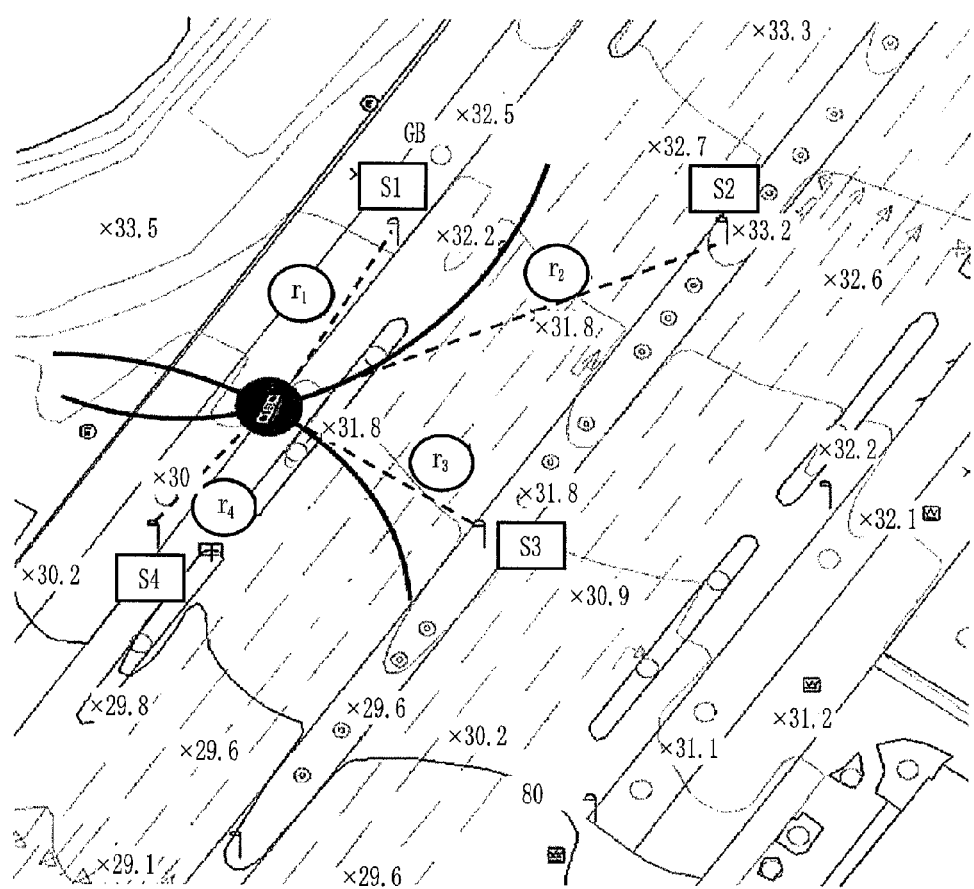
FIG. 4 is a diagram for describing location determination using a digital map.

Meanwhile, a digital map for a geographic information system (GIS) can be used to obtain the reference location points. FIG. 4 is a diagram for describing location determination using a digital map. Hereafter, a method for determining a location of a mobile object based on a TDoA using a digital map having information about urban facilities such as streetlamps S1 to S4 will be described.

A distance between a reference location point such as a RFID reader and a mobile object such as a RFID tag can be expressed as shown in Eq. 3.

$$r_{i+1,i} = cD_{i+1,i} = r_{i+1} - r_i \qquad \text{Eq. 3}$$

In Eq. 3, $D_{i+1,i}$ denotes a TDoA between the $i^{th}$ streetlamp and $(i+1)^{th}$ streetlamp. If the location of a known $Si^{th}$ streetlamp is $(x_i, y_i, z_i)$, the location $(x, y, z)$ of a mobile object can be expressed as shown in Eq. 4.

$$r_i^2 = (x_i - x)^2 + (y_i - y)^2 + (z_i - z)^2 \qquad \text{Eq. 4}$$

That is, Eq. 4 forms a set of nonlinear equations for calculating a location of a mobile object. However, it is difficult to solve the Eq. 4. In order to solve nonlinear equation Eq. 4, there were many algorithms introduced. Although a method using Taylor series is simple, it has a converging problem because it uses recursion to solve a linear equation. A method of Fang can calculate an accurate solution when the number of measuring TDoAs is identical to a random number. However, the method of Fang cannot use more than four TDoAs and has ambiguity of selecting one of two roots to solve a quadratic equation.

Therefore, a method of Chan and Ho (hereinafter, 'CH algorithm') is used in the present embodiment. The CH algorithm provides the optimal performance to determine a location using current reference location points. A linear equation Eq. 5 can be obtained using the relation of $r_{i,j} = r_i - r_j$.

$$r_{3,2} + r_{2,1} - r_{3,1} = 0$$

$$r_{4,3} + r_{3,1} - r_{4,1} = 0$$

$$r_{4,2} + r_{2,1} - r_{4,1} = 0$$

$$r_{4,3} + r_{3,2} - r_{4,2} = 0 \qquad \text{Eq. 5}$$

In order to simplify Eq. 5, a variable $k_i = x_i^2 + y_i^2 + z_i^2$ is used. Then, it is simplified as:

$$l_1 = r_{3,2}k_1 + r_{2,1}k_3 - r_{3,1}k_2$$

$$m_1 = -2(r_{3,2}x_1 + r_{2,1}x_3 - r_{3,1}x_2)$$

$$u_1 = -2(r_{3,2}y_1 + r_{2,1}y_3 - r_{3,1}y_2)$$

$$z_1 = -2(r_{3,2}z_1 + r_{2,1}z_3 - r_{3,1}z_2).$$

Finally, Eq. 6 is obtained.

$$r_{3,2}r_{2,1}r_{3,1} = r_{3,2}r_1^2 + r_{2,1}r_3^2 r_{3,1}r_2^2 = l_1 + m_1 x + u_1 y + v_1 z \qquad \text{Eq. 6}$$

If a calculation procedure of Eq. 6 is identically applied to $(l_2, m_2, u_2, v_2)$, $(l_3, m_3, u_3, v_3)$, $(l_4, m_4, u_4, v_4)$, Eq. 7 to Eq. 9 can be obtained.

$$r_{4,3}r_{3,1}r_{4,1} = r_{4,3}r_1^2 + r_{3,1}r_4^2 - r_{4,1}r_3^2 = l_2 + m_2 x + u_2 y + v_2 z \qquad \text{Eq. 7}$$

$$r_{4,2}r_{2,1}r_{4,1} = r_{4,2}r_1^2 + r_{2,1}r_4^2 - r_{4,1}r_2^2 = l_3 + m_3 x + u_3 y + v_3 z \qquad \text{Eq. 8}$$

$$r_{4,2}r_{2,1}r_{3,1} = r_{4,3}r_2^2 + r_{3,2}r_4^2 - r_{4,2}r_3^2 = l_4 + m_4 x + u_4 y + v_4 z \qquad \text{Eq. 9}$$

If Eq. 6 to Eq. 9 are simplified, Eq. 10 is obtained.

$$\begin{bmatrix} m_1 & u_1 \\ m_2 & u_2 \end{bmatrix} \begin{bmatrix} x \\ y \end{bmatrix} = \begin{bmatrix} r_{3,2}r_{2,1}r_{3,1} - l_1 - v_1 z \\ r_{4,3}r_{3,1}r_{4,1} - l_2 - v_2 z \end{bmatrix} \qquad \text{Eq. 10}$$

$$\begin{bmatrix} m_3 & u_3 \\ m_4 & u_4 \end{bmatrix} \begin{bmatrix} x \\ y \end{bmatrix} = \begin{bmatrix} r_{4,2}r_{2,1}r_{4,1} - l_3 - v_3 z \\ r_{4,3}r_{3,2}r_{4,2} - l_4 - v_4 z \end{bmatrix}$$

Then, a location $(x, y, z)$ of a mobile object can be obtained from Eq. 10.

As described above, the RFID reader 10 or the location determination server 30 can calculate a location of a mobile object in the location determination system according to the first and the second embodiment. Here, the DB of the location determination server 30 includes the coordinates of RFID readers 20 in the location determination system according to the second embodiment. Or, each of the RFID readers 20 stores own location information and the location information of adjacent RFID readers in a DB thereof in the location determination system according to the first embodiment.

Although the location determination method according to the present embodiment was described to use the TDoA scheme through Eq. 2 to Eq. 10, the Cell ID scheme, the AoA scheme, the DoA scheme, the ToA scheme, and the RSSI scheme may be used to determine a location of a mobile object.

Hereinafter, a method for determining a location of a mobile object using a single raw triangle network according to an embodiment of the present invention will be described.

Figure 5:
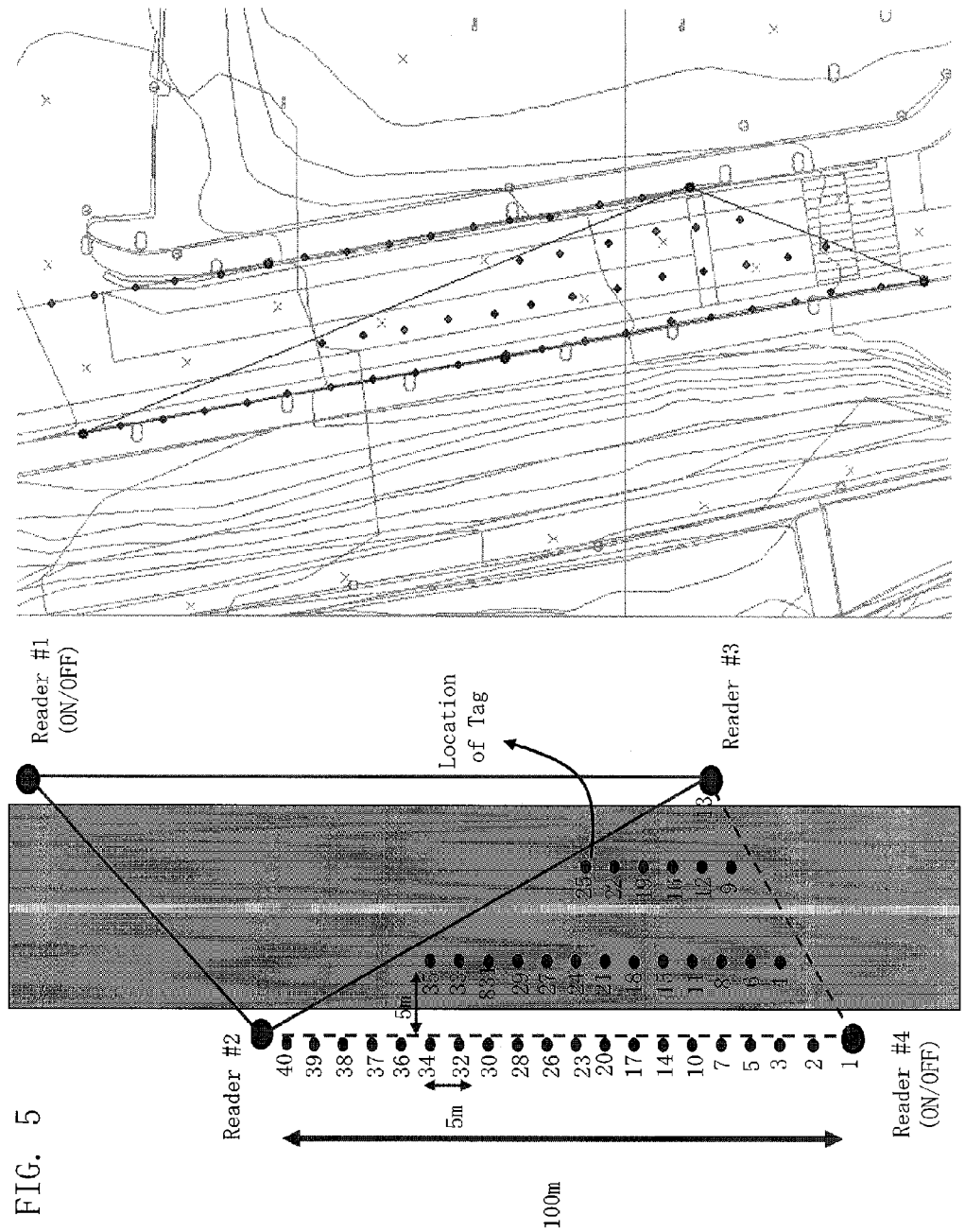
FIG. 5 is a digital map for describing a method for determining a location of a mobile object using a single raw triangle network according to an embodiment of the present invention.

FIG. 5 is a digital map for describing a method for determining a location of a mobile object using a single raw triangle network according to an embodiment of the present invention. The single raw triangle is to determine a relation of two points separated far away from each other. The single raw triangle is suitable to measure a narrow and long area.

In FIG. 5, three RFID readers forming a single raw triangle are selected to determine a location.

Here, the location determination method according to the present embodiment will be described for a case that a RFID tag is at the outside of a single raw triangle network and another case that a RFID tag is at the inside of the single raw triangle network. And, the location determination methods for two cases are compared and described to determine a further accurate location error. In order to effectively describing the location determination method according to the present embodiment, four RFID readers are selected.

Referring to FIG. 5, four RFID readers #1 to #4 are selected. The four RFID readers #1 to #4 transmit a search signal at a regular interval. The RFID readers #1 and #3 are disposed at the same side of a street, and the RFID reader #2 and #4 are disposed at the other side of the street. A distance between the RFID readers is about 100 m. Here, the first RFID reader #1 is turned on when the RFID reader #4 is turned off, and the RFID reader #4 is turned on when the RFID reader #1 is turned off for applying the single raw triangle structure.

In FIG. 5, forty RFID tags are disposed at an interval of about 5 m with the RFID readers #2 and #4 as a center. Each of the RFID tags generates a wireless signal having own ID information. If the RFID reader #1 is turned on, the RFID readers #1 to #3 form a single raw triangle, and the RFID tags are present at the outside of the single raw triangle.

However, if the RFID reader #4 is turned on, the RFID readers #2 to #4 form a signal raw triangle network structure, and the RFID tags are present at the inside of the single raw triangle. Table 1 shows distance errors from the RFID readers forming a single raw triangle to RFID tags, which are calculated using the CH algorithm, when each of the RFID reader #1 and the RFID reader #4 is turned on. Table 1 clearly shows that the distance errors are reduced when the RFID tags are present at the outside of the single raw triangle compared to when the RFID tags are present at the inside of the single raw triangle.

TABLE 1

| No. | x-axis | y-axis | DE-1* | DE-2* |
|---|---|---|---|---|
| 1 | 37.63 | 65.43 | 22.79 | 7.56 |
| 2 | 36.05 | 70.00 | 29.93 | 3.60 |
| 3 | 35.80 | 75.80 | 32.25 | 2.37 |
| 4 | 40.80 | 76.80 | 29.59 | 5.14 |
| 5 | 34.74 | 80.27 | 23.55 | 5.35 |
| 6 | 39.21 | 81.05 | 30.19 | 3.33 |
| 7 | 33.95 | 84.74 | 4.51 | 2.46 |
| 8 | 38.69 | 85.80 | 35.08 | 2.91 |
| 9 | 43.42 | 86.59 | 26.39 | 2.99 |
| 10 | 33.16 | 89.75 | 19.51 | 2.48 |
| 11 | 37.63 | 90.80 | 26.58 | 1.63 |
| 12 | 43.16 | 91.33 | 30.16 | 5.44 |
| 13 | 47.75 | 92.38 | 44.45 | 2.85 |
| 14 | 31.98 | 94.74 | 26.89 | 0.95 |
| 15 | 36.71 | 95.93 | 6.61 | 2.83 |
| 16 | 41.45 | 96.92 | 30.66 | 4.72 |
| 17 | 30.10 | 99.68 | 21.44 | 0.73 |
| 18 | 35.93 | 100.86 | 12.06 | 4.11 |
| 19 | 40.66 | 101.45 | 15.38 | 4.94 |
| 20 | 29.80 | 104.61 | 15.89 | 3.46 |
| 21 | 34.94 | 105.19 | 9.59 | 3.12 |
| 22 | 39.87 | 106.79 | 20.73 | 1.06 |
| 23 | 29.41 | 109.74 | 8.65 | 1.83 |
| 24 | 34.15 | 110.53 | 13.59 | 4.93 |
| 25 | 38.49 | 111.92 | 20.49 | 3.90 |
| 26 | 28.42 | 114.48 | 11.48 | 0.86 |
| 27 | 33.56 | 115.47 | 12.00 | 6.21 |
| 28 | 27.44 | 119.22 | 7.56 | 2.43 |
| 29 | 32.17 | 120.80 | 5.38 | 5.47 |
| 30 | 26.84 | 124.55 | 11.34 | 1.54 |
| 31 | 31.58 | 125.93 | 10.13 | 5.18 |
| 32 | 25.66 | 129.48 | 10.72 | 1.07 |
| 33 | 30.79 | 130.47 | 4.62 | 5.08 |
| 34 | 25.07 | 134.42 | 4.87 | 5.44 |
| 35 | 29.81 | 135.80 | 9.90 | 6.38 |
| 36 | 24.48 | 139.50 | 4.70 | 3.55 |
| 37 | 23.69 | 144.51 | 8.70 | 2.57 |
| 38 | 22.90 | 149.22 | 5.15 | 3.05 |
| 39 | 21.58 | 154.23 | 3.95 | 3.91 |
| 40 | 21.05 | 158.96 | 3.58 | 3.17 |

Figure 6:
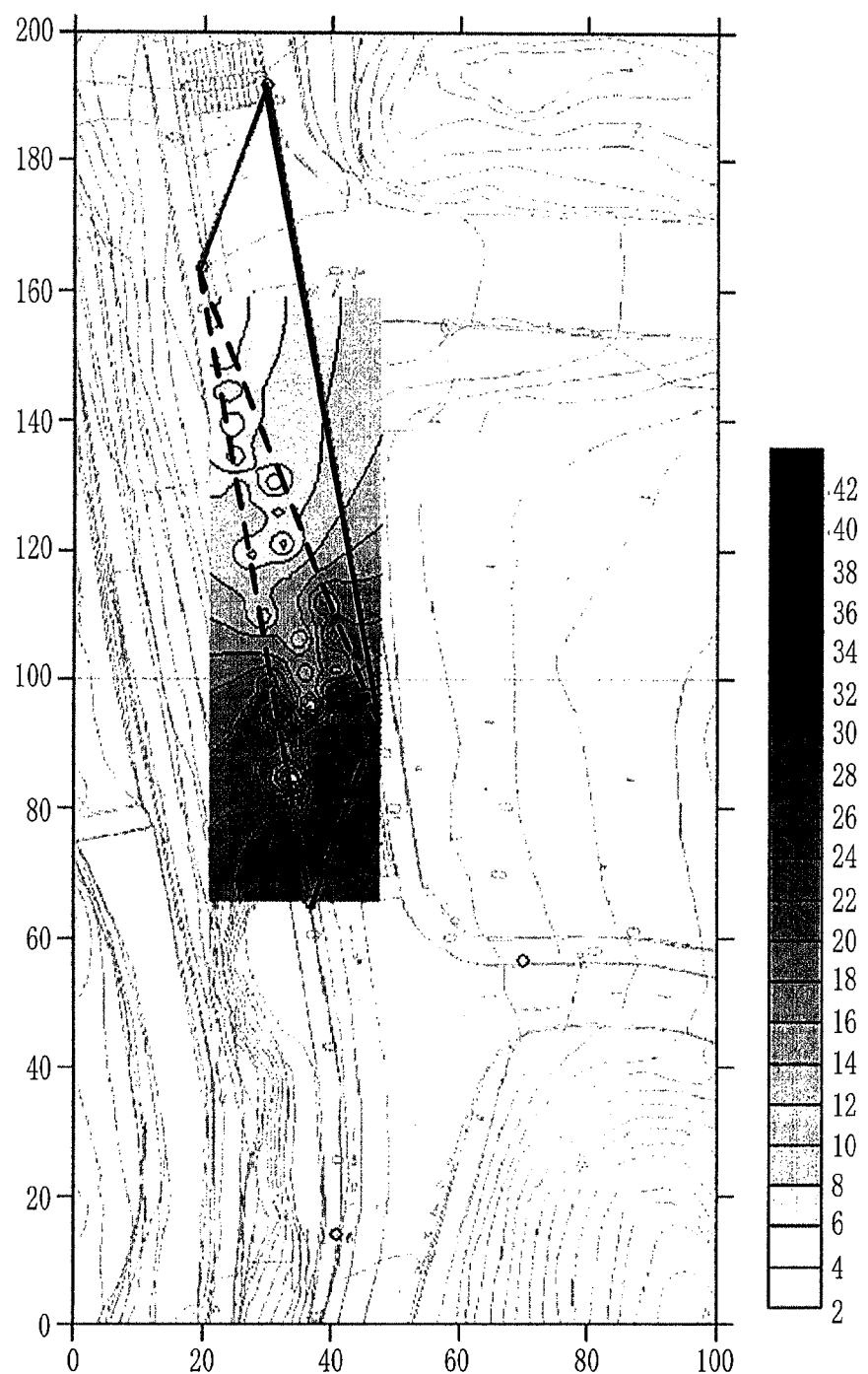
FIG. 6 is a diagram illustrating distance errors between RFID tags and RFID readers when the RFID tags are present at the outside of a single raw triangle in accordance with an embodiment of the present invention.
Figure 7:
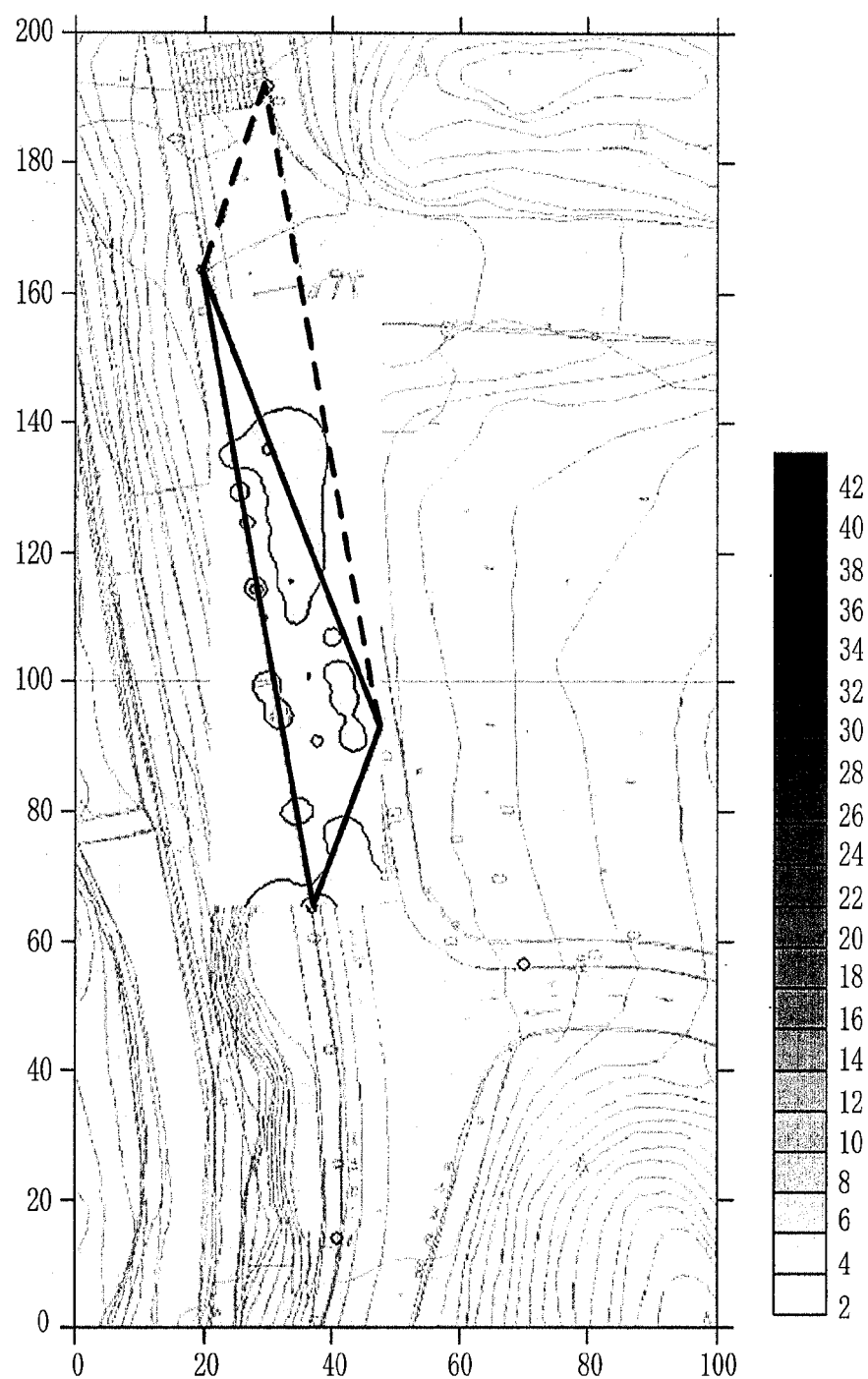
FIG. 7 is a diagram illustrating distance errors between RFID tags and RFID readers when the RFID tags are present at the inside of a single raw triangle in accordance with an embodiment of the present invention.

*DE-1: distance error outside single raw triangle
*DE-2: distance error inside single raw triangle FIG. 6 is a diagram illustrating distance errors between RFID tags and RFID readers when the RFID tags are present at the outside of a single raw triangle in accordance with an embodiment of the present invention. FIG. 7 is a diagram illustrating distance errors between RFID tags and RFID readers when the RFID tags are present at the inside of a single raw triangle in accordance with an embodiment of the present invention.

In FIGS. 6 and 7, the distance errors between the RFID tags and the RFID readers are divided by a region with reference to the results shown in Table 1, and the regions of the distance errors are distinguished based on black and white gradations. That is, the larger the distance error is, the darker, the black and white gradation of the region becomes. Also, the regions having the same distance error have the same gradation.

When the RFID tags are present at the outside of the single raw triangle, the deviation of the distance errors is great as shown in FIG. 6. However, the deviation of the distance errors is comparatively small as shown in FIG. 7 when the RFID tags are present at the inside of the single raw triangle.

Figure 8:
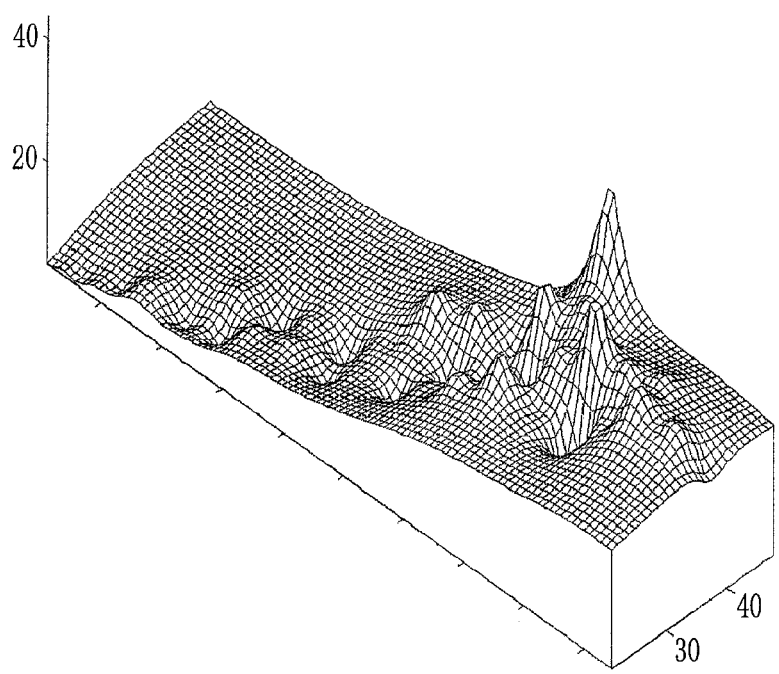
FIG. 8 is a diagram illustrating error distribution of FIG. 6 in three dimensions.
Figure 9:
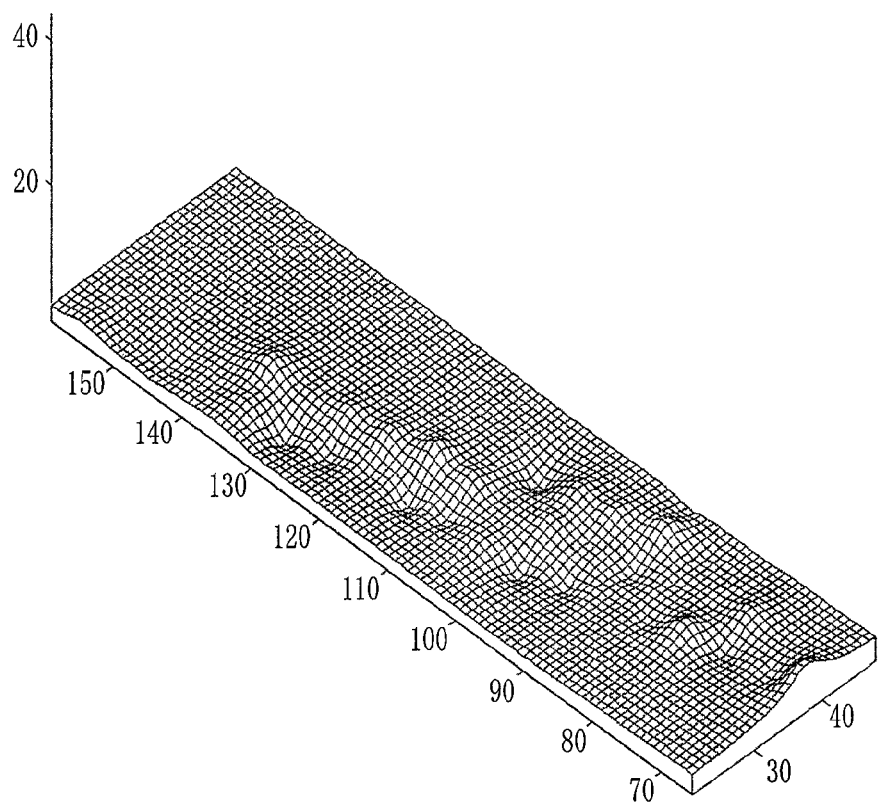
FIG. 9 is a diagram illustrating error distribution of FIG. 7 in three dimensions.

FIG. 8 is a diagram illustrating error distribution of FIG. 6 in three dimensions. FIG. 9 is a diagram illustrating error distribution of FIG. 7 in three dimensions. In FIGS. 8 and 9, the distance errors between the RFID tags and the RFID readers are divided by a region based on the results shown in Table 1, and the distance errors are expressed as an altitude according to each region. That is, the larger the distance error is, the higher the altitude becomes.

As shown in FIG. 8, the altitudes are comparatively high when the RFID tags are present at the outside of the single raw triangle. On the contrary, the altitudes are comparatively low when the RFID tags are present at the inside of the single raw triangle.

Figure 10:
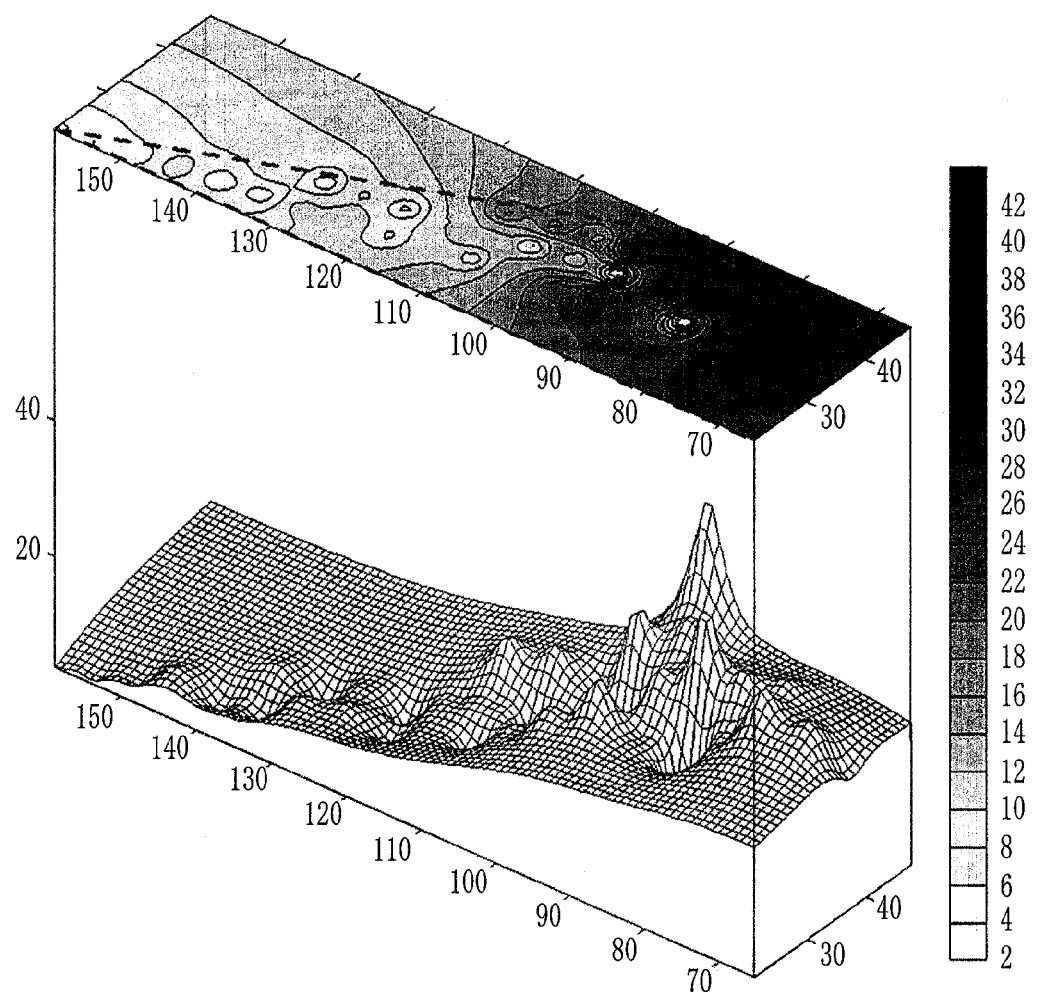
FIG. 10 is a diagram matching FIG. 6 to FIG. 8.
Figure 11:
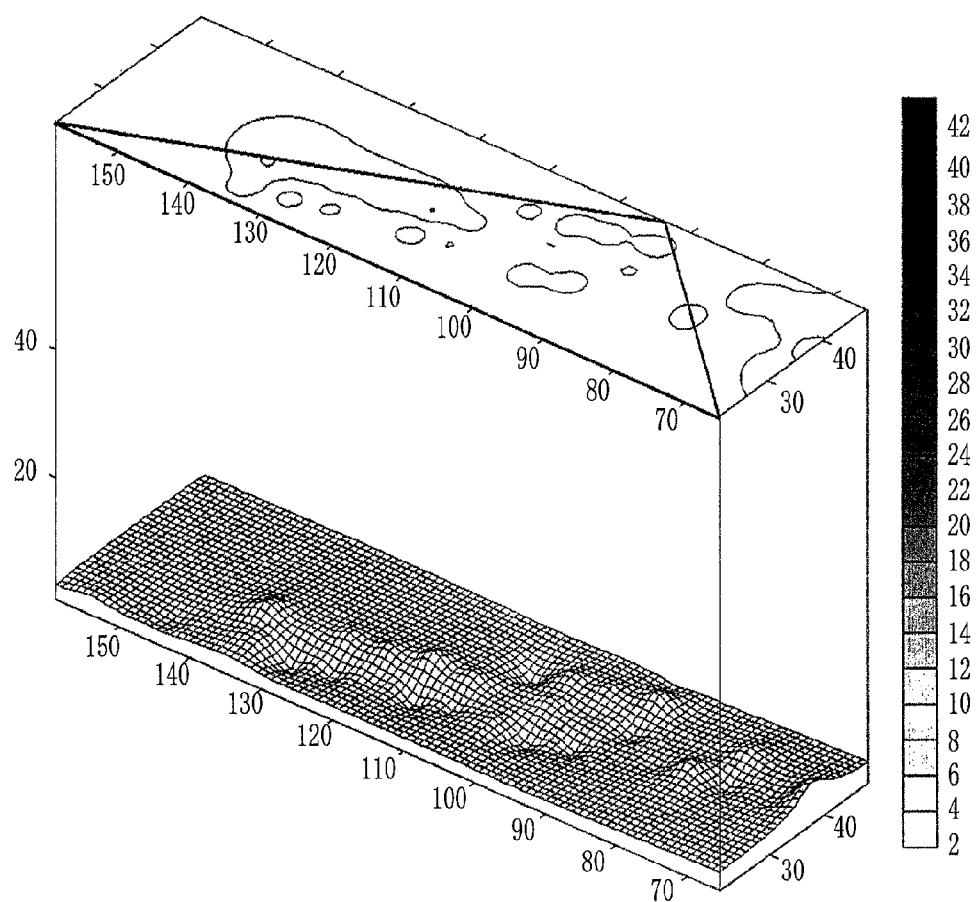
FIG. 11 is a diagram matching FIG. 7 to FIG. 9.

FIG. 10 is a diagram matching FIG. 6 to FIG. 8, and FIG. 11 is a diagram matching FIG. 7 to FIG. 9. Referring to FIGS. 10 and 11, the distance error is abruptly reduced when the RFID tags are present at the inside of the single raw triangle compared to the distance error when the RFID tags are present at the outside of the single raw triangle.

Hereinafter, a method for providing a location tracking service according to an embodiment of the present invention will be described based on the advantages that a location of a mobile object can be determined accurately regardless of environmental factors such as weather conditions and a distance error is abruptly reduced when RFID tags are disposed at the inside of the single raw triangle compared to the distance error when RFID tags are disposed at the outside of the single raw triangle.

Figure 14:
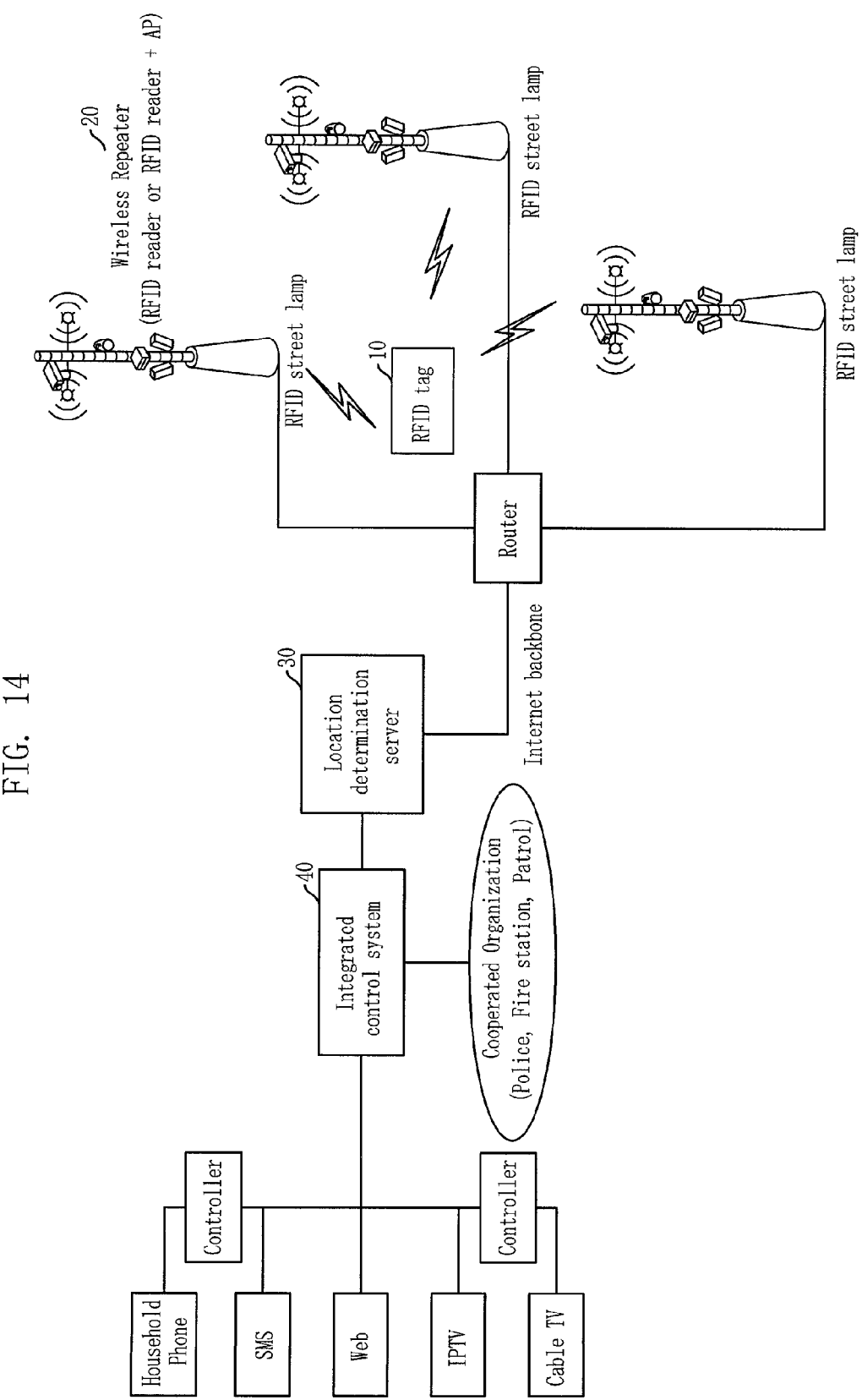
FIG. 14 is a diagram illustrating a location tracking service system in accordance with an embodiment of the present invention.

FIG. 14 is a diagram illustrating a location tracking service system in accordance with an embodiment of the present invention. The location tracking service according to the present embodiment enables a guardian to monitor the location of a target object in real time as the first embodiment and informs a guardian through a mobile phone when a target object has an abnormal situation as the second embodiment. Here, the target object includes a child, an old person, a mentally disabled person, a pet, a product, an art, a vehicle, a notebook, and a PDA with a RFID tag 10 attached. For example, the location of a target object is monitored in real time through a broadcasting network (TV, IPTV), a telephone network, a mobile communication network, a wired/wireless Internet, and a mobile Internet according to the first embodiment. The abnormal situation may be when a target object escapes from an assigned area, when a child is escaped from a predetermined, when an emergency button of a RFID tag 10 is activated because a child encounters danger, when the power of the RFID tag 10 is turned off, and when the movement of the RFID tag 10 is not sensed for long time.

Here, when the abnormal situation occurs, the latest location of a target object is displayed on a GIS screen of a integrated control system 40 and an area around the latest location of the target object is monitored using a plurality of CCTVs disposed at close streetlamps. Then, a variable message system (VMS) that provides traffic information displays the description of a missing child or the detail of an accident, a police station is informed about the location and the detail of the target object, the details of an accident is transmitted to the PDA of a patrol, and a SMS/MMS service is provided to portable phones of related neighbors as the third embodiment.

Also, a supplementary service can be provided through an environmental sensor installed at a streetlamp or a state measuring sensor installed at the RFID tag 10 as to the fourth embodiment. Here, the environmental sensor includes a temperature sensor, a humidity sensor, and a hydrogen sensor.

In the first embodiment, the streetlamps are used as fundamental infra to determine a location by technically connecting the RFID reader 20 to the streetlamp. That is, a RFID reader 20 for detecting an accurate location using GIS is installed at an intelligent RFID streetlamp and identifies accurate locations of a target object having a RFID tag 10 in real time. The streetlamps have many advantages to be used as a reference location point. That is, the streetlamps have accurate location information which is measured based on the national GIS project. Since the streetlamps are disposed at a regular interval, it is easy to form a network for tracking a location of a mobile object.

Furthermore, the streetlamp can satisfy the technical specifications for supplying the power to the RFID reader and the RFID tag. Moreover, if the streetlamps are used, it is not required to install additional facilities for RFID based location determination. Therefore, if the streetlamp are used, a cost of building the location determination system according to the present embodiment can be reduced.

Here, the RFID reader 20 of each streetlamp stores the own coordinate and the coordinates of adjacent streetlamp having RFID readers 20 in a form of a database as reference location points and manages the reference location database. The reference location points such as coordinate information can be obtained using a digital map produced by GIS. The coordinate of each streetlamp having the RFID reader 20 may be stored in a DB of the location determination server 30 and managed by the location determination server 30 like the location determination system according to the second embodiment.

According to the first embodiment, a request of a location tracking service ('My child protection service' from KT) is received. When the service is requested, a guardian may assign a monitoring object such as a cable broadcasting service (TV), an IPTV supplementary service, a wired telephone supplementary service, a mobile phone supplementary service, a WEB/WAP, and a mobile Internet supplementary service. Also, the guardian may set a recognition range of a RFID tag 10. For example, the guardian may set an apartment complex as the recognition range of the RFID tag 10.

Here, a plurality of RFID tags 10 may be given to a member of the location tracking service according to the present embodiment, for example, as many as the number of children or the number of family members. The unique number of the RFID tag 10 is matched to log-in information for cable broadcasting, IPTV, wired telephone, mobile telephone, and wired/wireless Internet after authentication. Here, the unique number of the RFID tag 10 is matched to a wired telephone/mobile telephone of a guardian in order to inform a guardian according to the third embodiment when an abnormal situation occurs.

Hereinafter, a possible service scenario according to the first embodiment will be described. A service member, Mrs. Kim, has a son, John. John puts a RFID tag bracelet 10 on his wrist. When John plays with his friends at a playground near his house, Mrs. Kim select one of cable broadcasting channels such as 99 if she is curious about his son.

Then, the location of John is displayed with predetermined map information through the channel 99. Also, the movement of John is displayed in real time on the predetermined map information through the channel 99. Here, the map information may be a normal map with satellite images, aerial photographs, and 3-D images.

After Mrs. Kim checked that John is safely playing with his friend, Mrs. Kim turns off TV and cleans the house. Here, the integrated control system 40 identifies the location of each RFID tag 10 obtained realtime and broadcasts only the location information of a corresponding RFID tag 10 mapped to each service member. That is, only location of John is displayed on TV in real time. As shown in FIG. 14, the controller transmits only the location information of a RFID tag 10 of a corresponding service member to a TV or an IPTV through a cable broadcasting network or an IPTV network.

In the first embodiment, it is also possible to check a location of a child in real time by accessing one of a mobile communication service server, a WEB service server, a WAP service server, and a mobile Internet server through a mobile communication network, a wired/wireless Internet, or a mobile Internet, which is assigned by a member when a member registers for the service. Here, only a location of a RFID tag mapped to a corresponding ID or a corresponding telephone number if a member uses an ID or a telephone number as log-in information. When a member accesses one of the servers through a telephone network or a mobile communication network, it is possible to provide a location tracking service through a voice service, a short message service (SMS), and a multimedia messaging service (MMS). Here, a location of a RFID tag 10 mapped to a corresponding wired telephone number or mobile phone number is provided through a voice service, a short message service (SMS), and a multimedia messaging service (MMS).

The location tracking service according to the first embodiment is not limited to a method of determining a location of a mobile object based on coordinates of streetlamps like the location determination systems according to the first and the second embodiments. That is, another coordinates may be assigned to provide a location of a mobile object, for example, a name of a street, a name of a building, and a name of a playground.

In the location tracking service according to the first embodiment, if at least two RFID tags 10 are mapped to one monitoring object, two RFID tags 10 may be displayed on the same TV screen. Or, the TV screen may be divided in to a plurality of sub-screens and each of two RFID tags 10 may be displayed on difference sub-screens. Furthermore, only a location of a RFID tag 10 selected by a guardian may be provided in real time.

Hereinafter, a possible service scenario according to the second embodiment will be described. Mrs. Kim receives a warning message through a phone call while Mrs. Kim is cleaning the house after Mrs. Kim checks that John is safely playing with his friend at the playground. Here, the warning message may be transferred to a plurality of telephones or a mobile phone, which are registered when Mrs. Kim registers for the location tracking service.

Here, the warning message may be transferred when a target object escapes from a use range of a RFID tag 10 (when a child goes too far away from home), when a target object escapes from a recognition range of a RFID tag 10 which is set when a service is registered, when an emergency button of a RFID tag is activated (when a child is in danger), when the power of a RFID tag is turned off (when a RFID tag is broken), and when the movement of a RFID tag is not sensed for long time (when an accident occurs).

Figure 15:
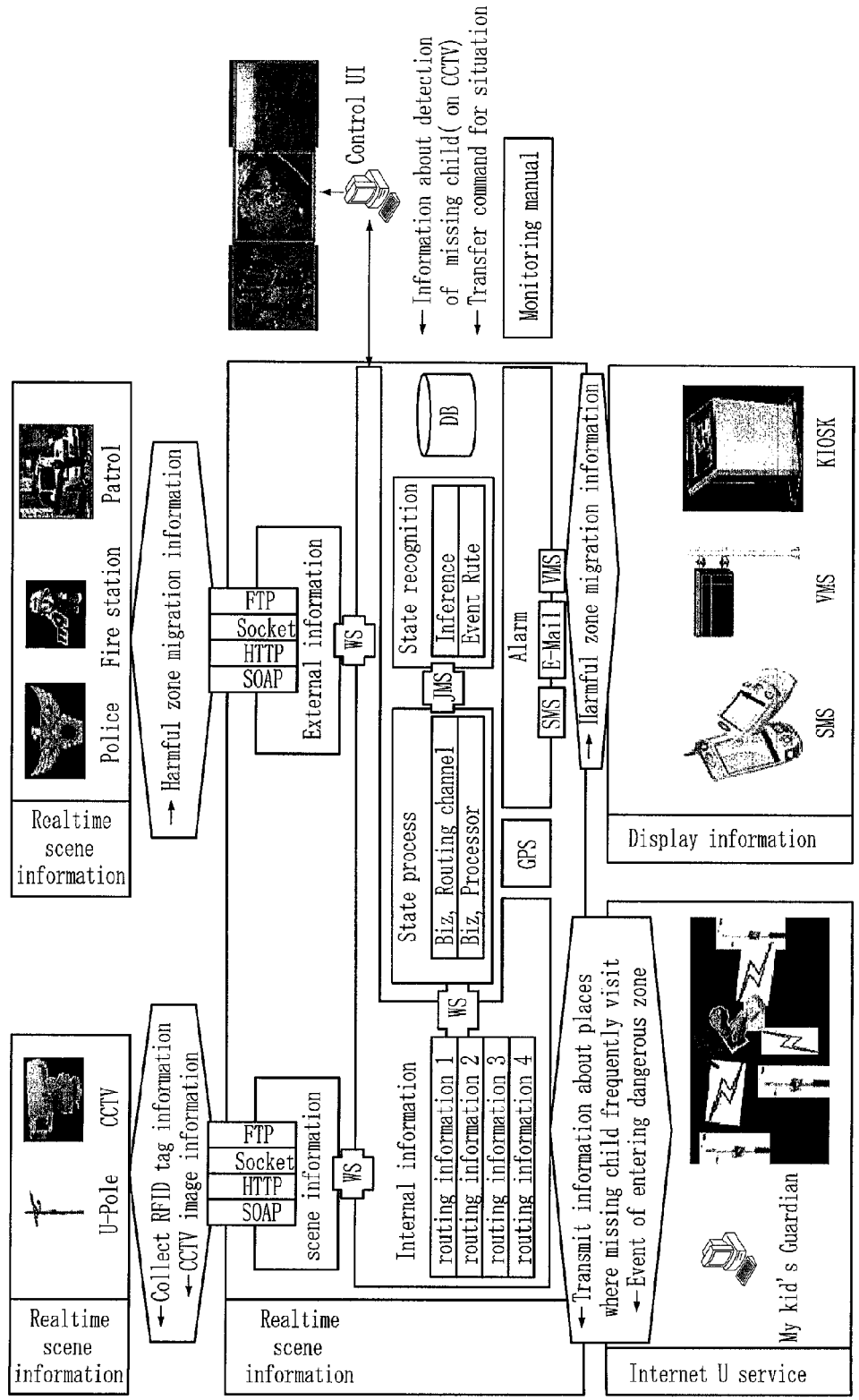
FIG. 15 is a diagram illustrating a platform structure of an integrated control system for a location determination service in accordance with an embodiment of the present invention.

Here, when the warning message is transmitted, the integrated control system 40 detects a current location and a traveling path of a RFID tag 10 and informs a predetermined cooperated organization such as a police station, a fire station, and patrols about the detected current location and traveling path in order to perform a proper task. In the location tracking service according to the third embodiment, the integrated control system 40 displays the latest location of a target object on a GIS screen and an area around the latest location of the target object is monitored using a plurality of CCTVs disposed at close streetlamps. Then, a variable message system (VMS) that provides traffic information displays the description of a missing child or the detail of an accident, a police station is informed about the location and the detail of the target object, the details of an accident is transmitted to the PDA of a patrol, and a SMS/MMS service is provided to portable phones of related neighbors as shown in FIG. 15.

Figure 16:
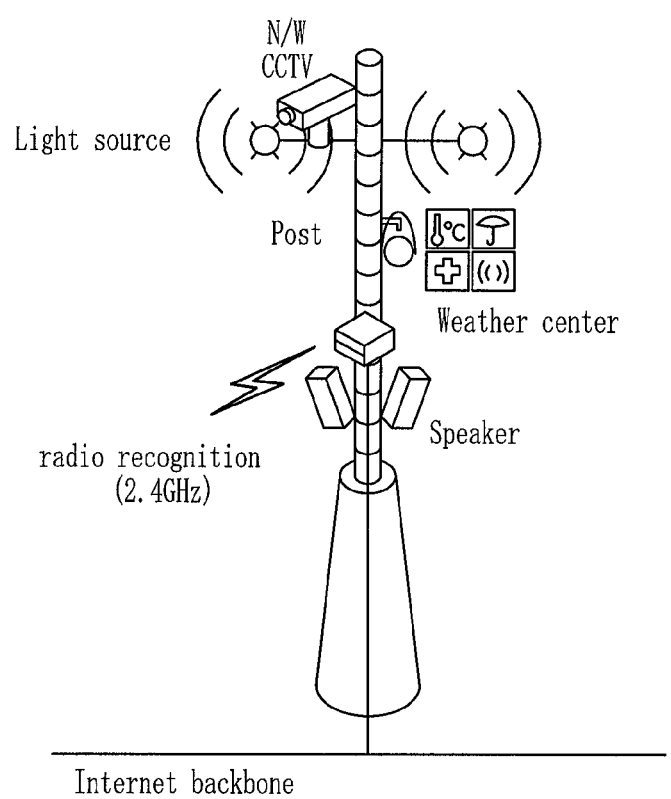
FIG. 16 is a diagram illustrating a RFID intelligent streetlamp for a location determination service in accordance with an embodiment of the present invention.

When a warning message is transmitted by activating the emergency button, a warning light installed at a streetlamp with the RFID reader 20 may be turned on to prevent the crime before it happens in the location tracking service according to the third embodiment. Also, a crime scene may be recorded using CCTV cameras disposed at more than three streetlamps with RFID readers 20, which recognize the RFID tag 10 of a target object, as shown in FIG. 16. The recorded crime scene may be used as a clue of finding a suspected person. Basically, the crime can be prevented before it happens.

After receiving the warning message, Mrs. Kim runs to the playground. While she is running to the playground, she receives a phone call from her husband who receives the same warning message through an office phone and a mobile phone. Mrs. Kim cannot find her son around the playground. While she is in fear of losing her son, she receives a phone call from the integrated control system 40 about her son is found around a pizza shop that is about 100 m separated from her home. Here, the integrated control system 40 makes the phone call to the telephone number and/or the mobile phone number where the first warning message is transmitted to.

That is, the integrated control system 40 senses related states after transmitting the warning message and performs predetermined tasks based on the location tracking service according to the third embodiment to find John.

Hereinafter, a possible service scenario according to the fourth embodiment will be described. Predetermined sensors are disposed at a streetlamp with a RFID reader 20. The sensors may be a temperature sensor, a humidity sensor, and a carbon dioxide sensor as shown in FIG. 16. The environmental sensors collect peripheral environmental information in a location tracking service according to the fifth embodiment or the state information. Also, a state detection sensor may be disposed at a streetlamp with a RFID tag 10. The state detection sensor may collect the state of a target child in a location tracking service according to the sixth embodiment. Furthermore, the peripheral environmental information may be collected from the environmental sensors and the state information of a target child may be collected from the state detection sensor at the same time in a location tracking service according to the seventh embodiment.

In the application service according to the fifth embodiment, a predetermined sensor collects the concentration of carbon dioxide and transmits a warning message to a guardian if the collected concentration of carbon dioxide is higher than a predetermined value through a normal phone or a mobile phone in order to suggest the guardian to make their child to return home. Or, a child is warned through the RFID tag 10 to make a child to return home.

In the application service according to the sixth embodiment, the condition of a child may be analyzed and a warning message may be transmitted to a guardian through a normal phone or a mobile phone in order to suggest the guardian to make their child to return home. Here, the condition of a child may be the heart rate and blood sugar. Or, a child is warned through the RFID tag 10 to make a child to return home.

In the application service according to the seventh embodiment (general analysis service of environmental information and state information), a warning message is transmitted to a guardian if it is determined that the current environment is not suitable to a child for playing based on the condition of the child such as a heart rate and blood sugar in order to suggest guardians to make their child to return home. Or, a child is warned through the RFID tag 10 to make a child to return home.

As described above, the present invention can be embodied as a missing child prevention system using a RFID intelligent streetlamp. If such RFID intelligent streetlamps are disposed at urban area as infra facilities, the location tracking service according to the present invention may be used to accurately determine a location of a mobile object for managing pedestrians and managing criminals in an urban area and a GPS non-applicable area.

As described above, a system for the location tracking service according to the first embodiment includes a database for managing information about RFID tags mapped to service members and a integrated control system 40 for determining a location of each RFID tag 10 by wirelessly identifying each RFID tag 10 and providing the determined location information to a corresponding service member through a communication network set by a corresponding service member. Here, the determined location information is information about a location of each RFID tag 10, which is determined based on a coordinate of an urban facility such as a streetlamp with a wireless repeater 20 for wirelessly identifying a RFID tag that attached at a target object such as a child, an old person, a mentally disabled person, a pet, an art, a product, a vehicle, a notebook computer, and a PDA. Here, the communication network is a wired/wireless cable broadcasting network, a telephone network, a mobile communication network, a wired/wireless Internet, and a mobile Internet.

Meanwhile, a system for the location determination according to the first embodiment and the location tracking according to the first embodiment includes a wireless repeater 20 for wirelessly identifying a RFID tag 10 by communicating with the RFID tag 10, a database for managing information about RFID tags mapped to service members, and a integrated control system 40 for determining a location of each RFID tag 10 by wirelessly identifying each RFID tag 10 and providing the determined location information to a corresponding service member through a broadcasting channel such as TV or IPTV. Here, the determined location information is information about a location of each RFID tag 10, which is determined based on a coordinate of an urban facility such as a streetlamp with a wireless repeater 20 for wirelessly identifying a RFID tag that attached at a target object such as a child, an old person, a mentally disabled person, a pet, an art, a product, a vehicle, a notebook computer, and a PDA.

Here, the wireless repeater 20 stores the coordinate of own streetlamp and the coordinates of streetlamps having adjacent wireless repeaters 20 as reference location information in a form of a database.

A system for the location determination according to the second embodiment and the location tracking according to the second embodiment includes a wireless repeater 20, a location determination server 30, and a integrated control system 40. The wireless repeater 20 wirelessly identifies a RFID tag 10 by communicating with the RFID tag 10 attached at a target object such as a child, an old person, a mentally disabled person, a pet, a product, an art, a vehicle, a notebook, and a PDA. Here, the RFID tag is a non-contact active tag.

The location determination server 30 determines a location of each RFID tag based on coordinates of predetermined urban facilities, for example a streetlamp, with the wireless repeater 20 installed as a reference point. The integrated control system 40 provides the determined location information of each RFID tag 10 to a corresponding service member through a broadcasting channel such as TV and IPTV.

Here, the location determination server 30 may previously store the coordinates of predetermined urban facilities with the wireless repeater 20 as reference location points in a form of a database or may be provided with the coordinates of predetermined urban facilities with the wireless repeater 20 from the location determination server 30 in real time.

The location tracking according to the first embodiment accurately determines a location of a RFID tag using the location determination according to the first and second embodiments.

For the location tracking according to the second embodiment, the DB must store at least one of RFID tag unique number issued to each of service members and at least one of telephone number such as a home phone number, an office phone number, and a mobile phone number to transmit a warning message when a related event occurs. The RFID tag unique numbers and the telephone numbers are managed by mapping to each of the service members.

Here, the warning message is transmitted when a RFID tag 10 escapes from a tag use range (when a RFID tag 10 escapes from a playground and an apartment complex in a triangle network structure), when a RFID tag 10 escapes from a tag recognition range (when a child goes far away from home), when an emergency request is received from the RFID tag 10 (when an emergency button of a RFID tag is activated), when the power of a RFID tag 10 is turned off (when related equipment is broken), and when the movement of a RFID tag 10 is not sensed for a predetermined time (when an accident occurs on a child). The warning message is transmitted to previously telephone numbers through a voice message and/or a text message. That is, a warning message is transmitted to the home telephone number and the office telephone number as a voice message, and a warning message is transmitted to a mobile phone number as a short message service.

For the location tracking according to the third embodiment, the integrated control system 40 performs at least one of a process of displaying the latest location of a target object on a GIS screen when the warning message is transmitted, a process of monitoring an area around a CCTV camera disposed at a streetlamp close to the latest location, a process of displaying the description of a target object and the details of an accident through a variable message system (VMS), and a process of informing the detail of an accident to cooperated organization such as a police station, a fire station, and patrols.

Although it is not shown, the RFID streetlamp may further include a horn outputting a warning sound in response to the control of the integrated control system 40 when an emergency button of a RFID tag 10 is activated.

For the location tracking according to the fourth embodiment, a RFID streetlamp further includes a predetermined sensor for collecting environmental information about a corresponding streetlamp, for example, a temperature sensor, a humidity sensor, a carbon dioxide concentration measuring sensor, a yellow sand measuring sensor. The sensor transmits the sensed environmental information to the integrated control system 40. Then, the integrated control system 40 analyzes the collected environmental information from the sensor and transmits a corresponding plan such as a warning message and an instruction message to a previously set telephone number such as a home telephone number, an office telephone number, and a mobile phone number or to the RFID tag 10.

For the location tracking according to the fourth embodiment, a RFID tag 10 may further includes a state sensor for collecting the state information of a target object, such as a heart rate and blood sugar, and providing the collected state information to the integrated control system 40. Then, the integrated control system 40 analyzes the collected state information from the state sensor and transmits a corresponding plan such as a warning message and an instruction message to a previously set telephone number such as a home telephone number, an office telephone number, and a mobile phone number or to the RFID tag 10.

The integrated control system 40 analyzes the collected environmental information and state information from the environmental sensor and state sensor and transmits the analysis result to the previously set telephone number or the RFID tag 10.

FIG. 17 is a flowchart of a method for providing a location tracking service in accordance with an embodiment of the present invention. As described above, RFID readers are installed at more than three stationary facilities such as streetlamps, and a CCTV camera, a horn, and an environmental sensor (weather sensor) are supplementary installed to the streetlamp. Here, if the RFID readers and the supplementary devices are installed at too high, it is difficult to manage. If the RFID readers and the supplementary devices are installed too low, the RFID readers and the supplementary devices may be easy to be damaged. Therefore, the RFID reader and the supplementary device are installed at a predetermined height according to a related law and regulation. However, streetlamps disposed at an apartment complex and a park are excluded as a restricting object by the related regulation.

The coordinates of streetlamps having RFID readers are extracted from a digital map as reference location points, and the extracted coordinates are stored and managed in the location determination server 30.

When a missing child prevention service is applied at step S171, a RFID tag 10 is given to a service member at step S172. Here, a plurality of RFID tags may be provided to each of service members. When the service is applied, a guardian assigns at least one of a cable broadcasting supplementary service, an IPTV supplementary service, a wired telephone supplementary service, a mobile phone supplementary service, a WEB/WAP service, and a mobile Internet supplementary service and sets a recognition range of the provided RFID tag 10 at step S173. The guardian may also select a telephone number or a mobile telephone number additionally in order to call the guardian when an abnormal situation occurs. Therefore, the DB stores and manages a monitoring product, a tag usage range, and a telephone number of each service member.

Then, if the RFID tag 10 is turned on, the integrated control system 40 determines the location of each RFID tag 10 in real time at step S174 and broadcasts the location information of a RFID tag 10 mapped to a corresponding service member at step S175. Here, the location of each RFID tag 10 is determined through the wireless repeater 20 and/or the location determination server 30.

Here, the controller transmits the location information of a RFID tag 10 of a corresponding service member to a TV through a cable broadcasting network or an IPTV network. The location information of the RFID tag 10 may be transmitted to a normal telephone and/or a mobile phone as a voice message and/or a text message at a regular interval. However, it allows a service member to check authenticated my child only.

When the RFID tag 10 escapes from a previously set recognition rage, when a tag is damaged, when a tag power is turned off, when an emergency situation occurs at step S176, the integrated control system 40 generates a warning message at step S178. The same warning message is simultaneously transmitted to a wired telephone such as a home phone or an office phone and a mobile phone, which are assigned when the service is applied. After transmitting the warning message, a missing child is reported automatically at step S179.

At step S181, a parent may report a missing child through the integrated control system 40 if the parent recognizes that a child is in a danger while monitoring the child through a TV. Particularly, when a warning message is generated by the emergency button, a horn installed at the streetlamp with the RFID reader 20 is turned on to output a warning sound, and CCTV cameras installed at more than three streetlamps identifying the RFID tag 10 record and store a related scene.

When the missing child is reported at steps S179 and S181 as described above, the integrated control system 40 detects a current location and a traveling path of a RFID tag 10 and informs cooperated organizations such as a police station, a fire station, and patrols of the detected current location and traveling path to perform predetermined tasks at steps S180 and S182. For example, the latest location of a target object is displayed on a GIS screen, an area around the latest location is monitored through the CCTV camera installed at a streetlamp closer to the latest location, the description of a missing child or the detail of an accident are displayed on a variable message system (VMS), the detail of an accident is informed to a PDA of a patrol, and the description of the missing child is transmitted to mobile phones of neighbors through a SMS or a MMS.

When a current location and a traveling path of the missing child are detected or when the missing child is found by patrols, the integrated control system 40 informs the parent or the guardian by transmitting a corresponding message to the telephone number and/or the mobile phone number at step S183.

The above described method according to the present invention can be embodied as a program and stored on a computer readable recording medium. The computer readable recording medium is any data storage device that can store data which can be thereafter read by the computer system. The computer readable recording medium includes a read-only memory (ROM), a random-access memory (RAM), a CD-ROM, a floppy disk, a hard disk and an optical magnetic disk.

While the present invention has been described with respect to certain preferred embodiments, it will be apparent to those skilled in the art that various changes and modifications may be made without departing from the spirits and scope of the invention as defined in the following claims.

INDUSTRIAL APPLICABILITY

The present invention can be used to determine a location of a mobile object in an urban area and a GPS non-applicable area.

What is claimed is:

1. A system for determining a location of a mobile object in real-time, comprising:
a wireless repeater for identifying a radio frequency identification (RFID) tag by communicating with the RFID tag attached or installed at a target object to determine a location thereof,
wherein the wireless repeater is installed at an urban facility and a location of the target object is determined based on a coordinate of a corresponding urban facility as a reference location point, and
wherein the location of the target object is determined based on a time of arrival (ToA) of a signal transmitted from the RFID tag, an attenuation of the signal, a direction of arrival (DoA) of the signal, and a time difference of arrival (TDoA) of the signal.

2. The system of claim 1, wherein the wireless repeater stores a coordinate of own urban facility and coordinates of urban facilities having adjacent wireless repeaters in a form of a database.

3. A system for determining a location of a mobile object in real-time, comprising:
a wireless repeater for identifying a radio frequency identification (RFID) tag by communicating with the RFID tag attached or installed at a target object to determine a location thereof; and
a location determination server for determining a location of the target object based on a coordinate of a corresponding urban facility having the wireless repeater as a reference location point,
wherein the location of the target object is determined based on a time of arrival (ToA) of a signal transmitted from the RFID tag, an attenuation of the signal, a direction of arrival (DoA) of the signal, and a time difference of arrival (TDoA) of the signal.

4. The system of claim 3, wherein the location determination server stores coordinates of urban facilities having the wireless repeaters as reference location points in a form of a database.

5. The system of claim 3, wherein the wireless repeater provides a coordinate of a corresponding urban facility as a reference location point to the location determination server when a location of the target object is tracked.

6. The system of claims 1, wherein the reference location points are obtained using a digital map produced for a geographic information system (GIS).

7. The system of claim 6, wherein the wireless repeater includes at least three RFID readers.

8. The system of claim 7, wherein at least three of the RFID readers form a single raw triangle structure by being installed at the urban facilities.

9. The system of claim 8, wherein the single raw triangle structure is formed by one RFID reader installed at an urban facility disposed at one side of a street and two RFID readers installed at urban facilities disposed at the other side.

10. The system of claim 7, wherein the wireless repeater further includes an access point (AP) connected to the RFID reader.

11. The system of claim 6, wherein in determining a location of the target object, a location of the RFID tag is calculated from coordinates stored in the database based on a cell ID of the wireless repeater.

12. The system of claim 6, wherein in determining a location of the target object, a distance between the wireless repeater and the RFID tag is calculated using a time of arrival (ToA) of a signal transmitted from the RFID tag to the wireless repeater and a location of the RFID tag is calculated based on the calculated distance and the coordinates stored in the database.

13. The system of claim 6, wherein in determining a location of the target object, an attenuation of a signal received from the RFID tag is measured, a distance between the wireless repeater and the RFID tag is calculated by applying a predetermined propagation model according to a predetermined environment, and a location of the RFID tag is calculated based on the calculated distance and the coordinates in the database.

14. The system of claim 6, wherein in determining a location of the target object, directions of arrival (DoA) of signals are estimated, and a location of the RFID tag is calculated based the crossing of the DoAs.

15. The system of claim 6, wherein in determining a location of the target object, a time difference of arrivals (TDoA) of signals is calculated and a location of the RFID tag is calculated based on crossing of cells from the calculated TDoA.

16. The system of claim 2, wherein the wireless repeater includes at least three RFID readers, and
each of the three RFID readers transmits a search signal at a regular interval, receives a response signal with identification information from the RFID tag in a propagation area of the search signal, calculates a distance to the RFID tag based on a difference between a time of transmitting the search signal and a time of receiving the received response signal from the RFID tag, and calculates a location of the RFID tag based on the calculated distance and the coordinates in the database.

17. The system of claim 4, wherein the wireless repeater includes at least three RFID readers,
each of the three wireless repeater transmits a search signal at a regular interval, receives a response signal with identification information from the RFID tag in a propagation area of the search signal, calculates a distance to the RFID tag based on a difference between a time of transmitting the search signal and a time of receiving the received response signal from the RFID tag, and transmits the calculated distance to the location determination server, and
the location determination server calculates a location of the RFID tag based on the calculated distance and the coordinates in the database.

18. The system of claim 1, wherein the urban facility is a streetlamp having accurate location data and capability of applying electric power.

19. The system of claim 1, wherein the location of the target objet is wirelessly transmitted to the RFID tag.

20. The system of claim 1, wherein the determined location of the target object is transmitted to at least one of a location determination server and an application service server through at least one of a wired communication network and a wireless communication network.

21. The system of claim 20, wherein the application service server is a missing child prevention service server.

22. The system of claim 3, wherein the determined location of the target object is transmitted to the application service server through at least one of a wired communication network and a wireless communication network.

23. The system of claim 22, wherein the application service server is a missing child prevention service server.

24. The system of claim 7, wherein a gap between the RFID reader is about 100 m and an installation height of the RFID reader is about 3.5 m from the ground.

25. A system for providing a location determination service, comprising:
a database for mapping radio frequency identification (RFID) tags provided to each subscriber to a corresponding subscriber and managing the mapped RFID tags; and
a location information providing means for classifying location information of each RFID tag, which are determined based on coordinates of urban facilities having wireless repeaters that identify the RFID tag attached or installed at a target object as reference location points, by a subscriber and providing the classified location information through a predetermined communication network set by a corresponding subscriber,
wherein the determined location information of each RFID tag is calculated based on a time of arrival (ToA) of a signal transmitted from the RFID tag, an attenuation of the signal, a direction of arrival (DoA) of the signal, and a time difference of arrival (TDoA) of the signal.

26. The system of claim 25, wherein the communication network is at least one of a wired broadcasting network, a wireless broadcasting network, a telephone network, a mobile communication network, a wired Internet, a wireless Internet, and a mobile Internet.

27. A system for providing a location determination service comprising:
a database for mapping radio frequency identification (RFID) tags provided to each subscriber to a corresponding subscriber and managing the mapped RFID tags; and
a location information providing means for classifying location information determined by identifying each RFID tag by a subscriber and providing the classified location information through a broadcasting network,
wherein the determined location information of each RFID tag is calculated based on a time of arrival (ToA) of a signal transmitted from the RFID tag, an attenuation of the signal, a direction of arrival (DoA) of the signal, and a time difference of arrival (TDoA) of the signal.

28. The system of claim 27, wherein the location information is determined based on coordinates of urban facilities having wireless delay devices that identify the RFID tag attached or installed at a target object.

29. A system for providing a location determination service comprising:
a database for mapping radio frequency identification (RFID) tags provided to each subscriber to a corresponding subscriber and managing the mapped RFID tags; and
a location information providing means for classifying location information of each RFID tag, which is determined based on coordinates of urban facilities having wireless delay devices that identify the RFID tag attached or installed at a target object, by a subscriber and providing the classified location information through a broadcasting network,
wherein the determined location information of each RFID tag is calculated based on a time of arrival (ToA) of a signal transmitted from the RFID tag, an attenuation of the signal, a direction of arrival (DoA) of the signal, and a time difference of arrival (TDoA) of the signal.

30. A system for providing a location determination service, comprising:
a wireless repeater for identifying a RFID tag attached or installed at a target object by communicating with the RFID tag;

a database for mapping the RFID tags provided to each subscriber to a corresponding subscriber and managing the mapped RFID tags; and a location information providing means for classifying location information of each RFID tag, which is determined based on coordinates of corresponding urban facilities having the wireless repeater by a subscriber and providing the classified location information through a broadcasting network, wherein the determined location information of each RFID tag is calculated based on a time of arrival (ToA) of a signal transmitted from the RFID tag, an attenuation of the signal, a direction of arrival (DoA) of the signal, and a time difference of arrival (TDoA) of the signal.

31. The system of claim 30, wherein the wireless repeater stores a coordinate of own urban facility and coordinates of urban facilities having adjacent wireless repeaters in a form of a database.

32. A system for providing a location determination service, comprising:

a wireless repeater for identifying a RFID tag attached or installed at a target object by communicating with the RFID tag;

a location determination server for determining a location of each RFID tag based on coordinates of corresponding urban facilities having the wireless repeater as reference location points; and a location information providing means for classifying the determined location information of each RFID tag by a subscriber and providing the classified location information through a broadcasting network, wherein the determined location information of each RFID tag is calculated based on a time of arrival (ToA) of a signal transmitted from the RFID tag, an attenuation of the signal, a direction of arrival (DoA) of the signal, and a time difference of arrival (TDoA) of the signal.

33. The system of claim 32, wherein the location determination server stores coordinates of urban facilities having wireless repeaters in a form of a database.

34. The system of claim 32, wherein the wireless repeater provides coordinates of corresponding urban facilities as reference location points to the location determination server in real-time when a location of the target object is tracked.

35. The system of claim 25, wherein the reference location points are obtained using a digital map produced by a geographic information system (GIS).

36. The system of claim 35, wherein the wireless repeater includes at least three RFID readers.

37. The system of claim 36, wherein at least three of the RFID readers form a single raw triangle structure by being installed at the urban facilities.

38. The system of claim 37, wherein the single raw triangle structure is formed by one RFID reader installed at an urban facility disposed at one side of a street and two RFID readers installed at urban facilities disposed at the other side.

39. The system of claim 36, wherein the wireless repeater further includes an access point (AP) connected to the RFID reader.

40. The system of claim 25, wherein the determined location information of each RFID tag is wirelessly transmitted to the RFID tag.

41. The system of claim 25, wherein the determined location information of each RFID tag is a value calculated from coordinates stored in the database based on a cell ID of the wireless repeater.

42. The system of claim 25, wherein the determined location information of each RFID tag is a value calculated by calculating a distance between the wireless repeater and the RFID tag using a time of arrival (ToA) of a signal transmitted from the RFID tag to the wireless repeater and calculating a location of the RFID tag based on the calculated distance and the coordinates stored in the database.

43. The system of claim 25, wherein the determined location information of each RFID tag is a value calculated by measuring an attenuation of a signal received from the RFID tag is measured, calculating a distance between the wireless repeater and the RFID tag by applying a predetermined propagation model according to a predetermined environment, and calculating a location of the RFID tag based on the calculated distance and the coordinates in the database.

44. The system of claim 25, wherein the determined location information of each RFID tag is calculated by estimating directions of arrival (DoA) of signals and calculating a location of the RFID tag based the crossing of the DoAs.

45. The system of claim 25, wherein the determined location information of each RFID tag is calculated by calculating a time difference of arrivals (TDoA) of signals and calculating a location of the RFID tag is calculated based on crossing of cells from the calculated TDoA.

46. The system of claim 25, wherein the urban facility is a streetlamp having accurate location data and capability of applying electric power.

47. The system of claim 46, wherein the database (DB) maps and manages at least one of RFID tag unique numbers provided to each subscriber and at least one of telephone numbers to transmit a warning message a predetermined event occurs.

48. The system of claim 47, wherein the warning message is transmitted when the RFID tag escapes from a tag usage area that is set when a service is subscribed, when the RFID tag escapes from a tag recognition range, when an emergency call request is received from the RFID tag, when power of the RFID tag is turned off, and when movement of the RFID tag is not sensed for a predetermined time.

49. The system of claim 48, wherein the warning message is transmitted to a previously set telephone number through a voice and/or a text message.

50. The system of claim 48, wherein when the warning message is transmitted, the location information providing means performs at least of a process of displaying a latest location of a target object in a GIS screen, a process of monitoring an area around the latest location of the target object using a CCTV camera installed at a streetlamp close to the latest location, a process of displaying description of the target object and detail of an accident through a variable message system (VMS), and a process of informing cooperated organizations such as a police station, a fire station, and patrols about the detail of an accident.

51. The system of claim 50, wherein the streetlamp further includes a CCTV camera for photographing a predetermined area in response to control of the location information providing means.

52. The system of claim 48, wherein the streetlamp further includes a horn for outputting a warning sound in response to control of the location information providing means.

53. The system of claim 47, wherein the streetlamp further includes an environmental sensor for collecting environmental information around a corresponding streetlamp and providing the collected environmental information to the location information providing means.

54. The system of claim 53, wherein the location information providing means analyzes the environmental information collected through the environmental sensor and informs a corresponding plan to a previously set telephone number or the RFID tag based on the analysis result.

55. The system of claim 47, wherein the RFID tag further includes a state measuring sensor for collecting state information of the target object and providing the collected state information to the location information providing means.

56. The system of claim 55, wherein the location information providing means analyzes the collected state information from the state measuring sensor and informs a corresponding plan to a previously set telephone number or the RFID tag based on the analysis result.

57. The system of claim 36, wherein a gap between the RFID readers is about 100 m and an installation height of the RFID reader is about 3.5 m from the ground.

* * * * *

UNITED STATES PATENT AND TRADEMARK OFFICE
CERTIFICATE OF CORRECTION

PATENT NO. : 8,502,670 B2  
APPLICATION NO. : 12/446258  
DATED : August 6, 2013  
INVENTOR(S) : Maeng-Q Cha et al.

Page 1 of 1

It is certified that error appears in the above-identified patent and that said Letters Patent is hereby corrected as shown below:

In the Title Page of the Letters Patent, for item (22) PCT Filed section, the date "Oct. 20, 2007" should be corrected --Oct. 18, 2007--.

Signed and Sealed this  
Twelfth Day of November, 2013

Teresa Stanek Rea  
*Deputy Director of the United States Patent and Trademark Office*